United States Patent
Sato et al.

(10) Patent No.: US 7,369,983 B2
(45) Date of Patent: May 6, 2008

(54) DEVICE AND METHOD FOR SIMULATING COMMUNICATION SYSTEM CAPABLE OF EASILY CONTROLLING PROTOCOL MESSAGE

(75) Inventors: Tsuyoshi Sato, Atsugi (JP); Tsutomu Tokuke, Atsugi (JP); Shoichi Nakamura, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 265 days.

(21) Appl. No.: 10/551,953

(22) PCT Filed: Feb. 28, 2005

(86) PCT No.: PCT/JP2005/003321

§ 371 (c)(1),
(2), (4) Date: Oct. 5, 2005

(87) PCT Pub. No.: WO2005/086449

PCT Pub. Date: Sep. 15, 2005

(65) Prior Publication Data

US 2006/0206296 A1    Sep. 14, 2006

(30) Foreign Application Priority Data

Mar. 4, 2004    (JP)    ............................. 2004-061451

(51) Int. Cl.
*G06F 9/445* (2006.01)
*G06F 13/00* (2006.01)
*H04L 29/06* (2006.01)

(52) U.S. Cl. ........................ 703/25; 709/223; 370/252; 370/466; 370/472

(58) Field of Classification Search .................. 703/20, 703/25, 27; 709/223; 370/252, 466, 472
See application file for complete search history.

(56) References Cited

U.S. PATENT DOCUMENTS

| | | | | |
|---|---|---|---|---|
| 5,535,373 | A | * | 7/1996 | Olnowich ..................... 703/25 |
| 2003/0156549 | A1 | * | 8/2003 | Binder et al. ................ 370/252 |
| 2004/0049481 | A1 | * | 3/2004 | Blevins .......................... 707/1 |
| 2004/0143655 | A1 | * | 7/2004 | Narad et al. ................. 709/223 |

FOREIGN PATENT DOCUMENTS

| | | |
|---|---|---|
| JP | 9-233156 A | 9/1997 |
| JP | 2000-151743 A | 5/2000 |
| JP | 2003-60735 A | 2/2003 |

OTHER PUBLICATIONS

3GPP TS25.331 (RRC Protocol Specification 2002/03, pp. 1-29; pp. 550-554; 3rd Generation Partnership Project; 1999.
Notification Concerning Transmittal of International Preliminary Report on Patentability, Chapter I of the Patent Cooperation Treaty, and Written Opinion of the International Searching Authority dated Dec. 7, 2006 for PCT/JP2005/003321, 5 sheets.

* cited by examiner

*Primary Examiner*—Thai Phan
(74) *Attorney, Agent, or Firm*—Frishauf, Holtz, Goodman & Chick, P.C.

(57) ABSTRACT

In a definition file, a convention including a definition regulated with respect to a configuration of nodes which are information elements of protocol messages in communication with a communication terminal to be evaluated is described. An interface library is configured so as to include an application program interface which can provide and receive operational information with respect to the nodes of the protocol messages to and from an exterior section. A memory managing section manages various data relating to the nodes of the protocol messages. A decode processing section specifies a data region and a value of data allocated to each node in the protocol messages by processing to decode the protocol messages along the definition regulated in the definition file and in accordance with the operational information from the exterior section to the interface library, and delivers data for each node corresponding to the protocol messages to the memory managing section. An encode processing section generates a desired protocol message by combining the data relating to the nodes of the protocol messages managed at the memory managing section, along the definition regulated in the definition file and in accordance with the operational information from the exterior section to the interface library.

20 Claims, 12 Drawing Sheets

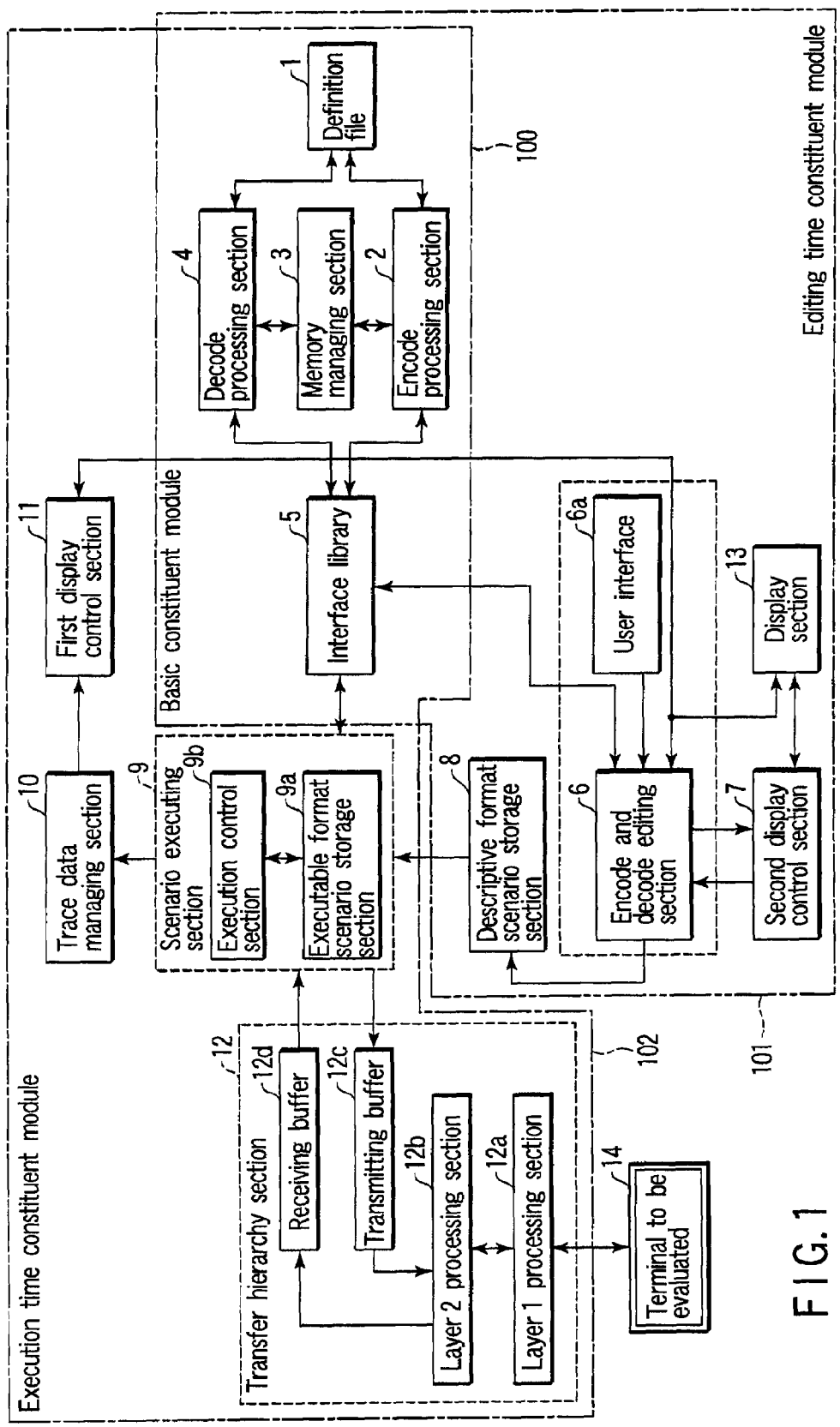
F I G. 1

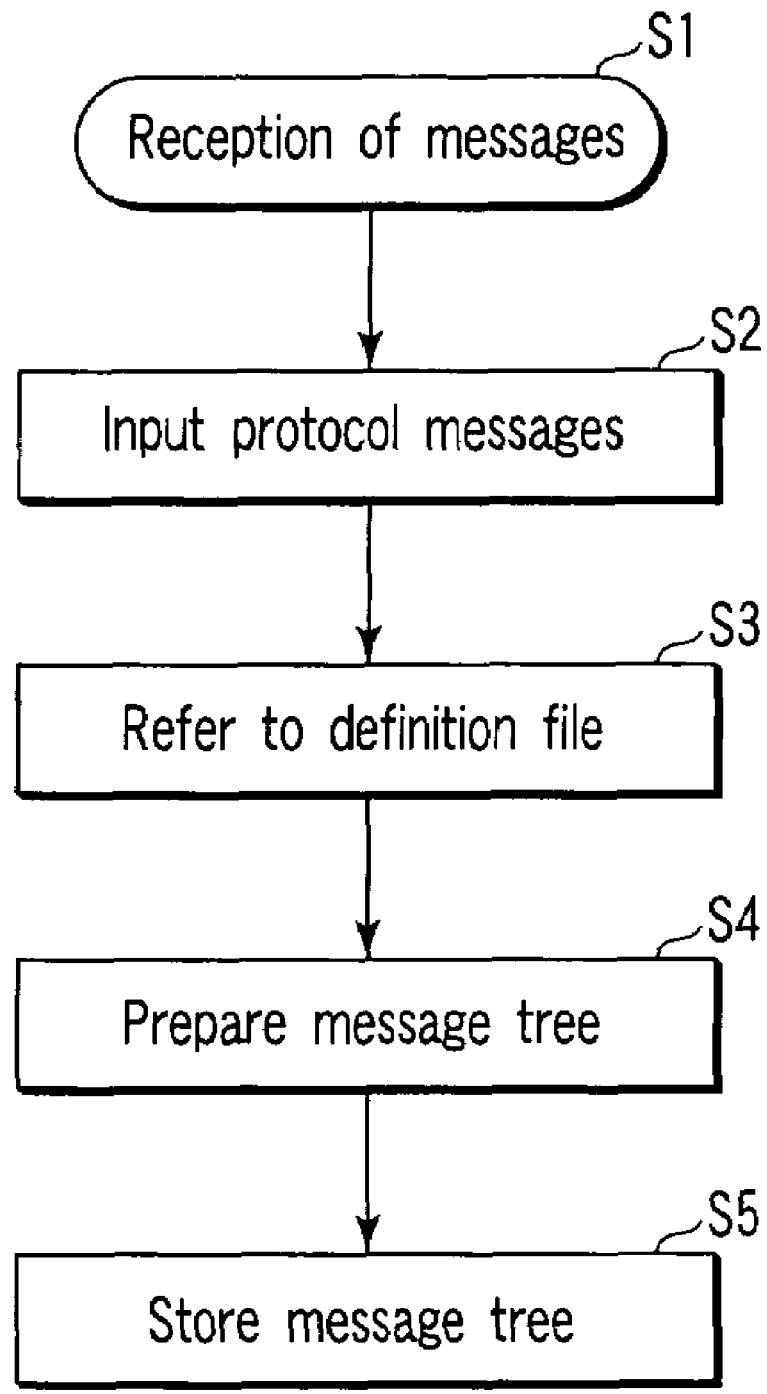
F I G. 2A

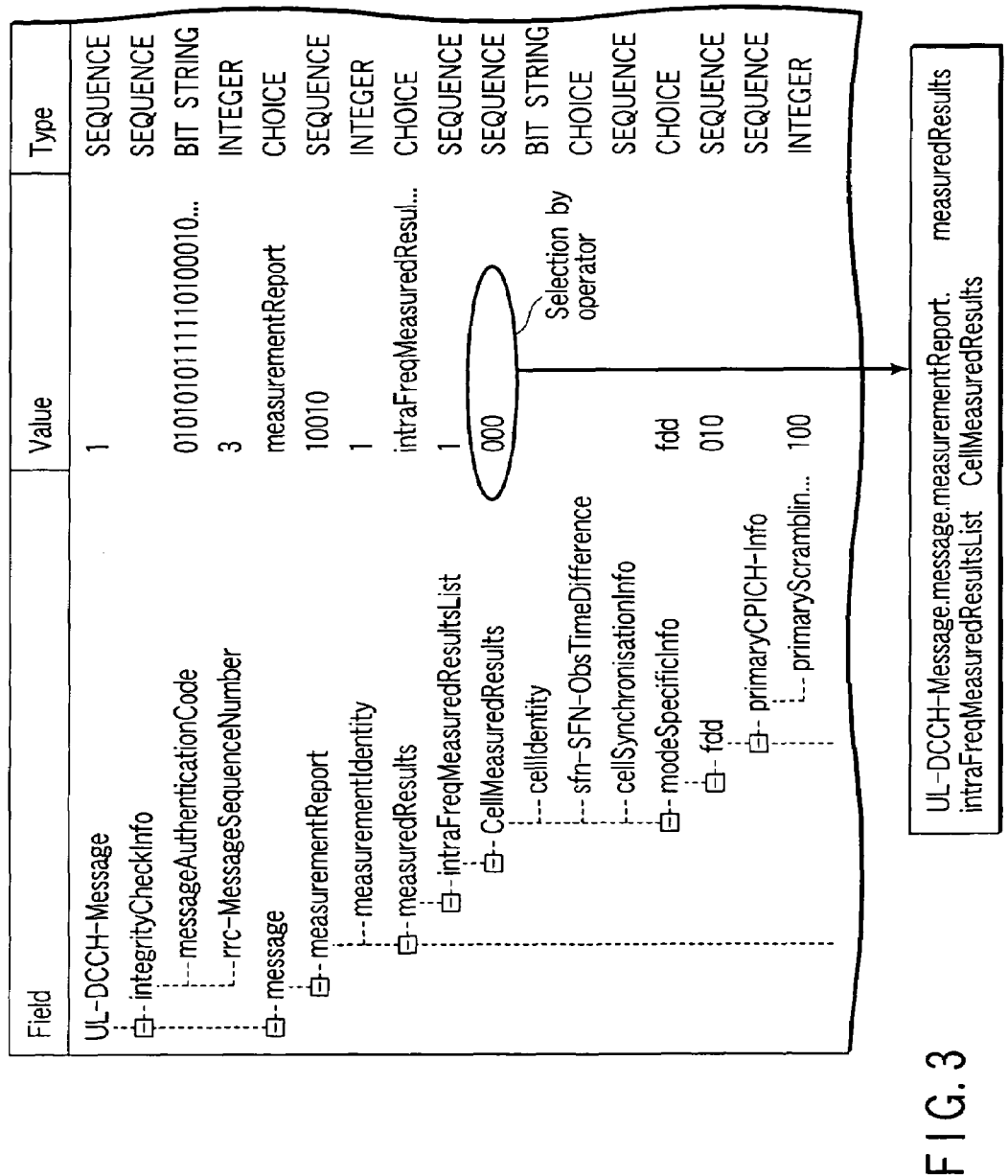
F I G. 3

| Line | Scenario |
|---|---|
| 1 | ReceiveMessage (RcvDataTmp); |
| 2 | API_Decode (RcvDataTmp, r_buff); |
| 3 | API_GetValueAt (r_buff, Reception path 1, variable 1); |
| 4 | API_Decode (Default Transmit Message, s_buff); |
| 5 | API_SetValueAt (s_buff, Transmission path 1, variable 1); |
| 6 | API_Encode (s_buff, Transmit Message); |
| 7 | SendMessage (Transmit Message); |

FIG. 5

| Field | Value | Reference | Type |
|---|---|---|---|
| DL-DCCH-Message | | | SEQUENCE |
| ⋯integrityCheckInfo | 0 | 0 | SEQUENCE |
| ⊟-message | downlinkDirectTransfer | downlinkDirectTransfer | CHOICE |
| ⊟-downlinkDirectTransfer | r3 | r3 | CHOICE |
| ⊟-r3 | 0 | 0 | SEQUENCE |
| ⊟-downlinkDirectTransfer-r3 | | | SEQUENCE |
| ⋯rrc-TransactionIdentifier | 0 | | INTEGER |
| ⋯cn-DomainIdentity | ps-domain | cs-domain (Correct solution value) | ENUMERATED |
| ⋯nas-Message | 08022034901 44F0010080... | | OCTET STRING |
| ⋯nonCriticalExtensions | 0 | | SEQUENCE |

F I G. 6

| Field | Value | Type |
|---|---|---|
| ⊟-UL-CCCH-Message | 0 | SEQUENCE |
| ⋮--integrityCheckInfo | | SEQUENCE |
| ⊟-message | rrcConnectionRequest | CHOICE |
| ⊟-rrcConnectionRequest | 00 | SEQUENCE |
| ⊟-initialUE-Identity | tmsi-and-LAI | CHOICE |
| ⊟-tmsi-and-LAI | | SEQUENCE |
| ⋮--tmsi | 0000000000000000... | BIT STRING |
| ⊟-lai | | SEQUENCE |
| ⊟-plmn-Identity | | SEQUENCE |
| ⊟-mcc | | SEQUENCE OF |
| ⋮--Digit | 0 | INTEGER |

FIG. 8A (PRIOR ART)

| Field | Value | Type |
|---|---|---|
| ⊟-UL-CCCH-Message | 1 | SEQUENCE |
| ⊟-integrityCheckInfo | 0000000000000000... | SEQUENCE |
| ⋮--messageAuthenticationCode | 0 | BIT STRING |
| ⋮--rrc-MessageSequenceNumber | rrcConnectionRequest | INTEGER |
| ⊟-message | 00 | CHOICE |
| ⊟-rrcConnectionRequest | tmsi-and-LAI | SEQUENCE |
| ⊟-initialUE-Identity | | CHOICE |
| ⊟-tmsi-and-LAI | 0000000000000000... | SEQUENCE |
| ⋮--tmsi | | BIT STRING |
| ⊟-lai | | SEQUENCE |
| ⊟-plmn-Identity | | SEQUENCE |
| ⊟-mcc | 0 | SEQUENCE OF |
| ⋮--Digit | | INTEGER |

FIG. 8B (PRIOR ART)

```
Related portion extracted from TS25.331
UL-CCCH-Message ::= SEQUENCE {
        integrityCheckInfo       IntegrityCheckInfo        OPTIONAL,
        message                  UL-CCCH-MessageType
}
IntegrityCheckInfo ::=                   SEQUENCE {
        messageAuthenticationCode        MessageAuthenticationCode,
        rrc-MessageSequenceNumber        RRC-MessageSequenceNumber
}
MessageAuthenticationCode ::=            BIT STRING (SIZE (32))
RRC-MessageSequenceNumber ::=            INTEGER (0 ... 15)
UL-CCCH-MessageType ::= CHOICE {
        cellUpdate                       CellUpdate,
        rrcConnectionRequest             RRCConnectionRequest,
        UraUpdate                        URAUpdate,
        spare                            NULL
}
```

DEVICE AND METHOD FOR SIMULATING COMMUNICATION SYSTEM CAPABLE OF EASILY CONTROLLING PROTOCOL MESSAGE

This application is a U.S. National Phase Application under 35 USC 371 of International Application PCT/JP2005/003321 filed Feb. 28, 2005.

TECHNICAL FIELD

The present invention relates to a simulation apparatus and a simulation method for a communication system, and in particular, to a simulation apparatus and a simulation method for a communication system, for carrying out connection tests for protocol messages in a communication with a communication terminal serving as an object to be evaluated.

BACKGROUND ART

Conventionally, A simulation apparatus for a communication system, for carrying out connection tests for protocol messages of the communication terminal by using a communication terminal currently under development as a product, for example, a mobile cellular phone as an object to be evaluated has been known.

Such a simulation apparatus for a communication system has a circuit for executing various communication tests with a communication terminal to be evaluated, by a communication system having predetermined communication protocols, for example, W-CDMA (Wideband-Code Division Multiple Access) built-in inside thereof.

The simulation apparatus for the communication system basically possess, as a pseudo base station, a series of procedures for measuring predetermined performances which correspond to a communication system as described above in a connection state of a communication terminal to be evaluated, and is configured so as to transmit a series of test signals including predetermined message information along the procedures to the communication terminal to be evaluated, and to receive a series of response signals corresponding to the series of test signals for measuring predetermined performances from the communication terminal to be evaluated.

In a case of carrying out tests for protocol messages in communication with a communication terminal serving as an object to be evaluated, the simulation apparatus for the communication system is configured so as to describe the contents of a series of processings including a series of procedures for measuring predetermined performances as described above in a scenario, and to operate in accordance with the scenario.

In this case, in a convention used for describing the protocol message of the communication system, the protocol message is configured from a gathering of hierarchical and enumerated nodes. Here, the nodes are information elements.

Types such as INTEGER, SEQUENCE, CHOICE, BIT STRING, or the like, as shown in FIGS. 8A and 8B, are regulated for each node of those nodes configuring the protocol message.

One node is expressed by a binary digit string of a length of 0 or more (Encode), and the types of SEQUENCE, SEQUENCE OF, and CHOICE have child elements (have been made to be a hierarchy), and SEQUENCE has a row of a plurality of nodes (is enumerated).

Further, a SEQUENCE type is a type as which a row of child nodes is defined, and when a SEQUENCE type has a value, 1 bit means the "existence/nonexistence" of a node which can be omitted.

In the case of an example shown in FIG. 8A, 0 which is UL-CCCH-Message value shows that integrityCheckInfo which can be omitted has been omitted.

In FIG. 8A, the value of UL-CCCH-Message is 0, and integrityCheckInfo is omitted, and rrcConnectionRequest (a place surrounded with the elliptic frame) which is a value of message is 2 bits from the second bit.

In FIG. 8B, because the value of UL-CCCH-Message is 1, and integrityCheckInfo is not omitted, rrcConnectionRequest (a place surrounded with the elliptic frame) which is a value of message is 2 bits from the thirty-eighth bit.

Here, the thirty-eighth bit corresponds to a position of a bit following a total (1+32+4=37) of 1 bit of UL-CCCH-Message, 32 bits of messageAuthenticationCode, and 4 bits of rrc-MessageSequenceNumber.

This is made clear with reference to the case in which UL-CC-CH-MessageType is a CHOICE type, in FIG. 9 shown as an extract of the related part of the above-described explanation from the specification 3GPP TS25.331 disclosed in non-Patent Document 1. Non-Patent Document 1: 3GPP TS25.331 (RRC Protocol Specification 2002/03 pp1-29, pp550-554)

Here, it is necessary to focus on the fact that, rrcConnectionRequest (the place surrounded with the elliptic frame) which is a value of message becomes 2 bits from the second bit in FIG. 8A, and in contrast thereto, in FIG. 8B, the position of the node of the protocol message when the protocol message of the communication system is described in a scenario is shifted in accordance with a type (SEQUENCE, CHOICE) of the message such that rrcConnectionRequest (the place surrounded with the elliptic frame) which is a value of message becomes 2 bits from the thirty-eighth bit.

Accordingly, in order to describe the protocol message for a communication system into a scenario, it is necessary to acquire a node in a protocol message as described above, and to carry out processing such as editing of a scenario, warning, or the like based on those data focusing on the fact that the position of a node to be processed is shifted in accordance with a value of a more previous node.

For example, as shown in FIG. 10, in a case of carrying out processing in which a tmsi (Temporary Mobile Subscriber) value of a receive protocol message (Receive Message) at a place surrounded with the elliptic frame is embedded into a transmit protocol message (Transmit Message), in a description of a scenario, as shown in FIG. 11, a receive protocol message is read with a specific place and a data size defined by a specification being designated, and is replaced with data of 32 bits which is a value read previously with a place to which a transmit protocol message corresponds being specified.

However, in this case, as described above, because the position of the node to be processed is shifted in accordance with a value of a more previous node, there is a problem in the point that a description of a scenario by an operator is difficult, and it is difficult to alert warning by determining a node.

DISCLOSURE OF INVENTION

An object of the present invention is to solve the problems in the conventional art as described above, and to provide a simulation apparatus and a simulation method for a communication system in which, an operator can easily describe the flexible protocol message test case (simulation), i.e., can easily control a protocol message by introducing means (a method) for reporting a descriptive format designating a node which is an information element of the protocol message, and an interface library (Application Program Interface: API) for accessing to the node at the time of executing the protocol message test case, based on the conception that all of encoding/decoding systems, structures of protocol messages, and the like are defined in accordance with a specification, and an attempt can be made to describe a protocol message test case even more user-friendly.

In order to achieve the aforementioned object, the simulation apparatus and the simulation method for the communication system according to the invention are configured such that an access to a node which is an information element in a protocol message is made easy by introducing an interface library calling an encoding and decoding function at the time of execution, and an acquisition or a change of a remarkable value is made easy by designating a node in the protocol message at the time of defining the operation of the simulation.

Specifically, in order to achieve the above object, according to a first aspect of the present invention, there is provided a simulation apparatus for a communication system, for carrying out tests for protocol messages in communication with a communication terminal (14) to be evaluated by transmitting test signals to the communication terminal (14) to be evaluated, and receiving response signals from the communication terminal (14) to be evaluated, comprising:

a definition file (1) in which a convention including a definition regulated with respect to a configuration of nodes which are information elements of protocol messages in communication with the communication terminal (14) to be evaluated has been described;

an interface library (15) including an application program interface which can provide and receive operational information with respect to the nodes of the protocol messages to and from an exterior section;

a memory managing section (3) which manages various data relating to the nodes of the protocol messages;

a decode processing section (4) which specifies a data region and a value of data allocated to each node in the protocol messages by processing to decode the protocol messages along the definition regulated in the definition file (1) and in accordance with the operational information from the exterior section to the interface library (5), and which delivers data of each node corresponding to the protocol messages to the memory managing section (3); and an encode processing section (2) which generates a desired protocol message by combining the data relating to the nodes of the protocol messages managed at the memory managing section (3), along the definition regulated in the definition file (1) and in accordance with the operational information from the exterior section to the interface library (5).

In order to achieve the above object, according to a second aspect of the present invention, there is provided a simulation apparatus for a communication system according to the first aspect, wherein the decode processing section (4) processes to decode the protocol messages input via the interface library (5), prepares a message tree showing a relationship of a hierarchy of each node of the protocol messages based on the definition regulated in the definition file (1) and outputs the message tree to the memory managing section (3), and detects data of an arbitrary node denoted by a path which has been designated from among the data relating to the nodes of the protocol messages managed at the memory managing section (3) based on a path denoting a node at which there is desired data, which is designated via the interface library (5).

In order to achieve the above object, according to a third aspect of the present invention, there is provided a simulation apparatus for a communication system according to the first aspect, further comprising:

a scenario executing section (9) which stores an executable format scenario in which a sequence for executing transmission in a desired protocol message to the communication terminal (14) to be evaluated and reception in the desired protocol message from the communication terminal (14) to be evaluated has been described, and which outputs at least a receive protocol message received from the communication terminal (14) to be evaluated to the interface library (5) by executing the executable format scenario in accordance with the sequence described in the executable format scenario;

a trace data managing section (10) which manages the sequence of the desired protocol message executed at the scenario executing section (9); and a first display control section (11) which carries out control for causing to display the sequence of the desired protocol message managed at the trace data managing section (10) onto a display section (13).

In order to achieve the above object, according to a fourth aspect of the present invention, there is provided a simulation apparatus for a communication system according the third aspect, wherein the decode processing section (4) processes to decode the protocol messages input via the interface library (5), prepares a message tree showing a relationship of a hierarchy of each node of the protocol messages based on the definition regulated in the definition file (1) and outputs the message tree to the memory managing section (3), and detects data of an arbitrary node denoted by a path designated from among the data relating to the nodes of the protocol messages managed at the memory managing section (3) based on a path denoting a node at which there is desired data, which is designated via the interface library (5).

In order to achieve the above object, according to a fifth aspect of the present invention, there is provided a simulation apparatus for a communication system according to the first aspect, further comprising:

an encode and decode editing section (6) which has a user interface (6a) to receive an editing operation in each section of node of a desired protocol message via the interface library (5), and which edits the desired protocol message;

a second display control section (7) which carries out control for causing to display onto the display section (13) contents of the editing operation in each section of node of the desired protocol message received by the user interface (6a) of the encode and decode editing section (6); and a descriptive format scenario storage section (8) which stores a descriptive format scenario described as a sequence for transmitting and receiving the desired protocol message edited at the encode and decode editing section (6).

In order to achieve the above object, according to a sixth aspect of the present invention, there is provided a simulation apparatus for a communication system according to the fifth aspect, wherein the decode processing section (4) processes to decode the desired protocol message, prepares a message tree showing a relationship of a hierarchy of each node of the desired protocol message based on the definition regulated in the definition file (1), causes to display the message tree onto the display section (13) via the second display control section (7), outputs it to the memory managing section (3), and detects data of an arbitrary node denoted by a path designated from among the data relating to the nodes of the desired protocol message managed at the memory managing section (3) based on a path denoting a node at which there is desired data, which is designated via the interface library (5).

In order to achieve the above object, according to a seventh aspect of the present invention, there is provided a simulation apparatus for a communication system according to the third aspect, wherein the scenario executing section (9) has an executable format scenario storage section (9a) which translates a descriptive format scenario in which a sequence for executing transmission in a desired protocol message to the communication terminal (14) to be evaluated and reception in the desired protocol message from the communication terminal (14) to be evaluated has been described, into an executable format scenario, and which stores a translated scenario, and the scenario executing section executes the sequence for transmitting and receiving in the desired protocol message with respect to the communication terminal (14) to be evaluated based on the executable format scenario stored in the executable format scenario storage section (9a).

In order to achieve the above object, according to an eighth aspect of the present invention, there is provided a simulation apparatus for a communication system according to the fourth aspect, wherein the scenario executing section (9) acquires a reception path denoting a desired node from the message tree of the desired receive protocol message which has been prepared by the decode processing section (4), and which relates to reception from the communication terminal (14) to be evaluated, acquires a value of data of an arbitrary node denoted by the reception path designated from among the data relating to the nodes of the receive protocol message managed at the memory managing section (3) based on the reception path, reads an expected value which has been stored in the scenario executing section (9) or the memory managing section (3) in advance, and which becomes an origin to be contrasted for determination, and comparatively determines an acquired value of the data of the node and a read expected value.

In order to achieve the above object, according to a ninth aspect of the present invention, there is provided a simulation apparatus for a communication system according to the eighth aspect, wherein the first display control section (11) causes to display the value of the data of the node acquired by the scenario executing section (9) and the expected value read by the scenario executing section (9) so as to correspond to each other onto the display section (13), and causes to display a comparatively determined result by the scenario executing section (9) so as to be identified as being normal or abnormal.

In order to achieve the above object, according to a tenth aspect of the present invention, there is provided a simulation apparatus for a communication system according to the sixth aspect, wherein the encode and decode editing section (6)

acquires a reception path denoting a desired node from the message tree of the desired receive protocol message which has been prepared by the decode processing section (4) in advance, and which relates to reception from the communication terminal (14) to be evaluated, and acquires a value of data of a node of the desired receive protocol message selected based on the reception path, and acquires a transmission path denoting a node corresponding to the selected node of the desired receive protocol message from the message tree of the desired transmit protocol message which has been prepared by the decode processing section (4) in advance, and which relates to transmission to the communication terminal (14) to be evaluated, and inserts a value of data of the selected node of the desired receive protocol message as a value of data of a node of the desired transmit protocol message selected based on the transmission path.

In order to achieve the above object, according to an eleventh aspect of the present invention, there is provided a simulation apparatus for a communication system according to the fourth aspect, wherein the decode processing section (4) selects a desired first node from an evaluation message tree prepared from evaluation protocol messages to be evaluated, and detects a second node which is a path same as a path of the desired first node selected from the evaluation message tree, from a reference message tree prepared from reference protocol messages for being compared with the evaluation protocol messages to be evaluated, and the first display control section (11) causes to display the first node selected from the evaluation message tree and a reference message tree including the second node detected from the reference message tree so as to be comparable onto the display section (13).

In order to achieve the above object, according to a twelfth aspect of the present invention, there is provided a simulation apparatus for a communication system according to the eleventh aspect, wherein in accordance with an opening/closing operation for a child tree from one message tree of the evaluation message tree and the reference message tree, opening/closing of another child tree which is same as the child tree is carried out.

In order to achieve the above object, according to a thirteenth aspect of the present invention, there is provided a simulation apparatus for a communication system according to the eleventh aspect, wherein the evaluation protocol message is a receive protocol message which becomes an object to be evaluated from the communication terminal (14) to be evaluated, and the reference protocol message is a receive protocol message for reference in communication by a terminal of a same type as that of the communication terminal (14) to be evaluated.

In order to achieve the above object, according to a fourteenth aspect of the present invention, there is provided a simulation method for a communication system, for carrying out tests for protocol messages in communication with a communication terminal (14) to be evaluated by transmitting test signals to the communication terminal (14) to be evaluated, and receiving response signals from the communication terminal (14) to be evaluated, the method comprising:

a step of preparing a definition file (1) in which a convention including a definition regulated with respect to a configuration of nodes which are information elements of the protocol messages in communication with the communication terminal (14) to be evaluated has been described;

a step of preparing an interface library (5) including an application program interface which provides and receives operational information with respect to the nodes of the protocol messages to and from an exterior section;

a step of preparing a memory managing section (3) which manages various data relating to the nodes of the protocol messages;

a step of processing to decode the protocol messages along the definition regulated in the definition file (1) and in accordance with the operational information from the exterior section to the interface library (5) to thereby specify a data region and a value of data allocated to each node in the protocol messages, and delivering data of each node corresponding to the protocol messages to the memory managing section (3); and a step of generating a desired protocol message by combining the data relating to the nodes of the protocol messages managed at the memory managing section (3), along the definition regulated in the definition file (1) and in accordance with the operational information from the exterior section to the interface library (5).

In order to achieve the above object, according to a fifteenth aspect of the present invention, there is provided a simulation method for a communication system according to the fourteenth aspect, wherein the step of processing to decode the protocol messages has:

a step of processing to decode protocol messages input via the interface library (5), preparing a message tree showing a relationship of a hierarchy of each node of the protocol messages based on the definition regulated in the definition file (1), and outputting the message tree to the memory managing section (3); and a step of detecting data of an arbitrary node denoted by a path designated from among the data relating to the nodes of the protocol messages managed at the memory managing section (3) denotes based on a path denoting a node at which there is desired data, which is designated via the interface library (5).

In order to achieve the above object, according to a sixteenth aspect of the present invention, there is provided a simulation method for a communication system according to the fourteenth aspect, further comprising:

a step of storing an executable format scenario in which a sequence for executing transmission in a desired protocol message to the communication terminal (14) to be evaluated and reception in the desired protocol message from the communication terminal (14) to be evaluated has been described;

a step of enabling to output at least a receive protocol message received from the communication terminal (14) to be evaluated to the interface library (5), by executing the executable format scenario in accordance with the sequence described in the executable format scenario;

a step of preparing a trace data managing section (10) which manages the sequence of the desired protocol message executed in the step of executing the scenario; and a step of carrying out a first display control for causing to display the sequence of the desired protocol message managed at the trace data managing section (10) onto a display section (13).

In order to achieve the above object, according to a seventeenth aspect of the present invention, there is provided a simulation method for a communication system according to the sixteenth aspect, wherein the step of processing to decode the protocol messages has:

a step of processing to decode the receive protocol message input via the interface library (5), preparing a message tree showing a relationship of a hierarchy of each node of the receive protocol message based on the definition regulated in the definition file (1), and outputting the message tree to the memory managing section (3); and a step of detecting data of an arbitrary node denoted by a path designated from among the data relating to the nodes of the receive protocol message managed at the memory managing section (3) based on a path denoting a node at which there is desired data, which is designated via the interface library (5).

In order to achieve the above object, according to an eighteenth aspect of the present invention, there is provided a simulation method for a communication system according to the fourteenth aspect, further comprising:

a step of preparing a user interface (6a) to receive an editing operation in each section of node of a desired protocol message via the interface library (5);

a step of editing to encode and decode the desired protocol message based on the editing operations received at the user interface (6a);

a step of carrying out a second display control for causing to display onto the display section (13) contents of the editing operation in each section of node of the desired protocol message received by the user interface (6a) in the step of editing to encode and decode; and a step of preparing a descriptive format scenario storage section (8) which stores a descriptive format scenario in which a sequence for transmitting and receiving the desired protocol message edited in the step of editing to encode and decode has been described.

In order to achieve the above object, according to a nineteenth aspect of the present invention, there is provided a simulation method for a communication system according to the eighteenth aspect, wherein the step of processing to decode the protocol messages has:

a step of processing to decode the desired protocol message, preparing a message tree showing a relationship of a hierarchy of each node of the desired protocol message based on the definition regulated in the definition file (1), and causing to display the message tree onto the display section (13) via the step of carrying out a second display control;

a step of outputting the message tree to the memory managing section (3); and a step of detecting data of an arbitrary node denoted by a path designated from among the data relating to the nodes of the desired protocol message managed at the memory managing section (3) based on a path denoting a node at which there is desired data, which is designated via the interface library (5).

In order to achieve the above object, according to a twentieth aspect of the present invention, there is provided a simulation method for a communication system according to the sixteenth aspect, wherein the step of executing a scenario has:

a step of preparing an executable format scenario storage section (9a) which translates a descriptive format scenario in which a sequence for executing transmission in a desired protocol message to the communication terminal (14) to be evaluated and reception in the desired protocol message from the communication terminal (14) to be evaluated has been described, into an executable format scenario, and which stores a translated scenario, and a step of executing the sequence for transmitting and receiving in the desired protocol message with respect to the communication terminal (14) to be evaluated based on the executable format scenario stored in the executable format scenario storage section (9a).

In order to achieve the above object, according to a twenty-first aspect of the present invention, there is provided a simulation method for a communication system according to the seventeenth aspect, wherein the step of executing a scenario has:

a step of acquiring the reception path denoting a desired node from the message tree of the desired receive protocol message which has been prepared by the step of processing to decode, and which relates to reception from the communication terminal (14) to be evaluated;

a step of acquiring a value of data of an arbitrary node denoted by the reception path designated from among the data relating to the nodes of the receive protocol message managed at the memory managing section (3) denotes based on the reception path acquired by the step of acquiring the reception path;

a step of reading an expected value which has been stored in the executable format scenario executing storage section (9a) or the memory managing section (3) in advance, and which becomes an origin to be contrasted for determination; and a step of comparatively determining an acquired value of the data of the node and a read expected value.

In order to achieve the above object, according to a twenty-second aspect of the present invention, there is provided a simulation method for a communication system according to the twenty-first aspect, wherein the step of carrying out a first display control has, onto the display section (13):

a step of causing to display the value of the data of the node acquired by the step of executing the scenario and the expected value read by the step of executing the scenario so as to correspond to each other; and a step of causing to display a comparatively determined result by the step of executing the scenario so as to be identified as being normal or abnormal.

In order to achieve the above object, according to a twenty-third aspect of the present invention, there is provided a simulation method for a communication system according to the nineteenth aspect, wherein the step of editing to encode and decode has:

a step of acquiring the reception path denoting a desired node from the message tree of the desired receive protocol message which has been prepared in advance by the step of processing to decode, and which relates to reception from the communication terminal (14) to be evaluated;

a step of acquiring a value of data of a node of the desired receive protocol message selected based on the reception path acquired by the step of acquiring the reception path;

a step of acquiring a transmission path denoting a node corresponding to the selected node of the desired receive protocol message from a message tree of a desired transmit protocol message which has been prepared in advance by the step of processing to decode, and which relates to transmission to the communication terminal (14) to be evaluated; and a step of inserting a value of data of the selected node of the desired receive protocol message as a value of data of the node of the desired receive protocol message selected based on the transmission path acquired by the step of acquiring the transmission path.

In order to achieve the above object, according to a twenty-fourth aspect of the present invention, there is provided a simulation method for a communication system according to the seventeenth aspect, wherein the step of processing to decode has:

a step of selecting a desired first node from an evaluation message tree prepared from evaluation protocol messages to be evaluated; and a step of detecting a second node which is a path same as the path of the desired first node selected from the evaluation message tree, from a reference message tree prepared from reference protocol messages for being compared with the evaluation protocol messages to be evaluated, and the step of carrying out a first display control has:

a step of causing to display the first node selected from the evaluation message tree and a reference message tree including the second node selected from the reference message tree so as to be compared onto the display section (13).

In order to achieve the above object, according to a twenty-fifth aspect of the present invention, there is provided a simulation method for a communication system according to the twenty-second aspect, wherein in accordance with an opening/closing operation for a child tree from one message tree of the evaluation message tree and the reference message tree, opening/closing of another child tree which is same as the child tree is carried out.

In order to achieve the above object, according to a twenty-sixth aspect of the present invention, there is provided a simulation method for a communication system according to the second aspect, wherein the evaluation protocol message is a receive protocol message which becomes an object to be evaluated from the communication terminal (14) to be evaluated, and the reference protocol message is a receive protocol message for reference in communication by a terminal of a same type as that of the communication terminal (14) to be evaluated.

In the simulation apparatus and the simulation method for the communication system according to the invention which are configured as described above, because there is no need to directly use the encode processing section (2) and the decode processing section (4) based on an operation by an operator and a scenario due to the interface library providing an application program interface (API) being introduced, a protocol message of the communication system can be easily controlled such that a description of processing in which the operator designates a specific node which is an information element of the protocol message of the communication system, or carries out an extraction and a change thereof is made easy.

Namely, in the simulation apparatus and the simulation method for the communication system according to the invention, it is possible for the operator to easily describe a flexible test case (simulation) by providing a tool of reporting a descriptive format designating nodes which are information elements of a protocol message of the communication system, and an interface library for accessing to the nodes at the time of executing a protocol message test case.

Concretely, in the simulation apparatus for the communication system according to the first aspect of the invention and the simulation method for the communication system according to the fourteenth aspect of the invention, a data region and a value of data allocated to each node which is an information element in the protocol message can be specified along a definition regulated by a protocol message described in the definition file (1), and moreover, in accordance with operational information from the exterior section with respect to the interface library (5), and a desired protocol message can be generated.

Further, in the simulation apparatus for the communication system according to the second aspect of the invention and the simulation method for the communication system according to the fifteenth aspect of the invention, a message tree showing a relationship of the hierarchy of each node of the protocol message is prepared based on the definition regulated in the definition file (1), and data of an arbitrary node which a path denotes can be detected from among data relating to the nodes of the protocol message managed at the memory managing section (3) based on a path denoting a node at which there is desired data designated via the interface library (5).

Further, in the simulation apparatus for the communication system according to the third aspect of the invention and the simulation method for the communication system according to the sixteenth aspect of the invention, by storing a scenario in an executable format in which a sequence for executing the transmission in a desired protocol message to the communication terminal (14) serving as an object to be evaluated and the reception in the desired protocol message from the communication terminal (14) serving as an object to be evaluated has been described, and by executing the scenario in an executable format in accordance with the sequence described in the scenario in an executable format, at least it is possible to output a receive protocol message received from the communication terminal (14) serving as an object to be evaluated, and due to the sequence of the desired protocol message managed at the trace data managing section (10) being displayed onto the display section (13), the sequence of the desired protocol message can be shown to the operator.

Further, in the simulation apparatus for the communication system according to the fourth aspect of the invention and the simulation method for the communication system according to the seventeenth aspect of the invention, the receive protocol message input via the interface library (5) is processed to be decoded, and a message tree showing a relationship of the hierarchy of each node of the receive protocol message is prepared based on the definition regulated in the definition file (1), and data of an arbitrary node which a path denotes designated can be detected from among the data relating to the nodes of the receive protocol message managed at the memory managing section (3) based on a path denoting a node at which there is desired data designated via the interface library (5).

Further, in the simulation apparatus for the communication system according to the fifth aspect of the invention and the simulation method for the communication system according to the eighteenth aspect of the invention, the desired protocol message is edited, and a sequence for transmitting and receiving the edited desired protocol message can be stored by being described in a scenario in a descriptive format.

Further, in the simulation apparatus for the communication system according to the sixth aspect of the invention and the simulation method for the communication system according to the nineteenth aspect of the invention, a message tree showing a relationship of the hierarchy of each node of the desired protocol message is prepared and the message tree is made to display on the display section (13) via the second display control section (7), and is outputted to the memory managing section (3), and data of an arbitrary node which the detected path denotes can be detected from among the data relating to the nodes of the desired protocol message managed at the memory managing section (3), based on a path denoting a node at which there is desired data designated via the interface library (5).

Further, in the simulation apparatus for the communication system according to the seventh aspect of the invention and the simulation method for the communication system according to the twentieth aspect of the invention, a sequence for transmission and reception in the desired protocol message with respect to the communication terminal (14) serving as an object to be evaluated can be executed based on a scenario in an executable format stored in the executable format scenario storage section (9*a*).

Further, in the simulation apparatus for the communication system according to the eighth aspect of the invention and the simulation method for the communication system according to the twenty-first aspect of the invention, a reception path denoting a desired node is acquired from a message tree of a desired receive protocol message, and a value of data of an arbitrary node which the reception path denotes is acquired, and an expected value which has been stored in advance and which becomes an origin to be contrasted for determination is read, and those acquired value of the data of the node and read expected value can be comparatively determined.

Further, in the simulation apparatus for the communication system according to the ninth aspect of the invention and the simulation method for the communication system according to the twenty-second aspect of the invention, the acquired value of the data of the node and the read expected value are displayed, and moreover, a result of the comparative determination can be displayed so as to be identified as being normal or abnormal.

Further, in the simulation apparatus for the communication system according to the tenth aspect of the invention and the simulation method for the communication system according to the twenty-third aspect of the invention, a reception path denoting a desired node is acquired from a message tree of a desired receive protocol message, and a value of data of the node of the desired receive protocol message selected based on the reception path is acquired, and a transmission path denoting a node corresponding to the selected node of the desired receive protocol message is acquired from a message tree of a desired protocol message which has been prepared in advance, and a value of the data of the selected node of the desired receive protocol message can be inserted as a value of the data of the node of the desired transmit protocol message which has been selected based on the transmission path.

Further, in the simulation apparatus for the communication system according to the eleventh aspect of the invention and the simulation method for the communication system according to the twenty-fourth aspect of the invention, a desired first node is selected from an evaluation message tree, and a second node which becomes a path same as a path of the selected desired first node is detected from a reference message tree, and the first node selected from the evaluation message tree and a reference message tree including the second node detected from the reference message tree can be comparably displayed.

Further, in the simulation apparatus for the communication system according to the twelfth aspect of the invention and the simulation method for the communication system according to the twenty-fifth aspect of the invention, in accordance with an opening/closing operation of a child tree from one message tree of the evaluation message tree and the reference message tree, opening/closing of the other child tree which is the same as the tree can be carried out.

Further, in the simulation apparatus for the communication system according to the thirteenth aspect of the invention and the simulation method for the communication system according to the twenty-sixth aspect of the invention, the evaluation protocol message is a receive protocol message which becomes an object to be evaluated from the communication terminal (14) serving as an object to be evaluated, and the reference protocol message can be made to be a receive protocol message for reference in communication by a terminal which is a same type as the communication terminal (14) serving as an object to be evaluated.

BRIEF DESCRIPTION OF DRAWINGS

FIG. 1 is a block diagram showing a configuration of one embodiment of a simulation apparatus for a communication system according to the invention.

FIG. 2A is a flowchart showing one embodiment of a simulation method for a communication system according to the invention.

FIG. 3 is a diagram for explaining that a desired node which is an information element in a protocol message can be designated in the simulation apparatus for the communication system and the simulation method for the communication system according to the invention.

FIG. 5 is a diagram showing the contents of descriptions of a scenario in the first embodiment made possible due to a desired node which is an information element in a protocol message being able to be designated in the simulation apparatus for the communication system and the simulation method for the communication system according to the invention.

FIG. 6 is a diagram showing a third embodiment made possible due to a desired node which is an information element in a protocol message being able to be designated in the simulation apparatus for the communication system and the simulation method for the communication system according to the invention.

FIG. 8A is a diagram for explanation of problems in a conventional art.

FIG. 8B is a diagram for explanation of problems in the prior art.

FIG. 9 is an diagram of portions related to FIGS. 8A and 8B in a specification 3GPP TS25.331 (RRC Protocol Specification 2002/03) shown in non-Patent Document 1 being extracted for explanation of the problems of the prior art.

BEST MODE FOR CARRYING OUT THE INVENTION

Figure 2B:
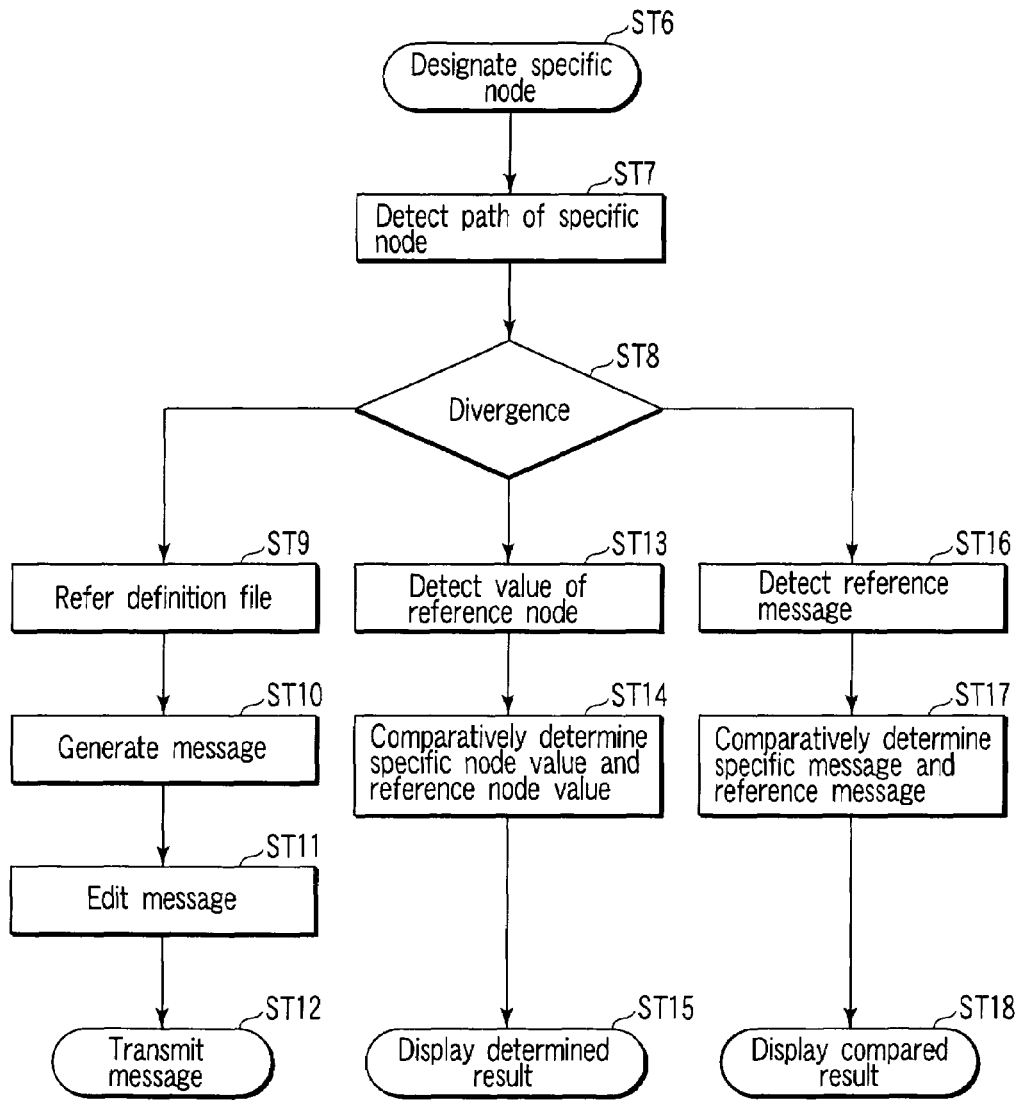
FIG. 2B is a flowchart showing one embodiment of a simulation method for a communication system according to the invention.

Hereinafter, preferred embodiments of a simulation apparatus for a communication system and a simulation method for a communication system according to the invention will be described with reference to FIGS. 1 to 7.

FIG. 1 is a block diagram showing a configuration of one embodiment of a simulation apparatus for a communication system according to the invention.

FIG. 2 is a flowchart for explanation of operations of a main portion of the simulation apparatus for the communication system of FIG. 1.

First, a configuration of the simulation apparatus for the communication system according to the invention will be described based on FIG. 1.

Basically, as shown in FIG. 1, the simulation apparatus for the communication system according to the invention is a simulation apparatus for a communication system, for carrying out tests for protocol messages in communication with the communication terminal 14 serving as an object to be evaluated by transmitting test signals to a communication terminal 14 serving as an object to be evaluated, and by receiving response signals from the communication terminal 14 serving as an object to be evaluated, and is configured so as to have a definition file 1 in which a convention including a definition regulated with respect to a configuration of nodes which are information elements of a protocol message in communication with the communication terminal 14 serving as an object to be evaluated, an interface library 5 including an application program interface which can provide and receive operational information for the nodes of the protocol message to and from an exterior section, a memory managing section 3 which manages various data relating to the nodes of the protocol message, a decode processing section 4 which specifies data regions and data values allocated to each node in the protocol message by processing to decode the protocol message, and which receives and delivers the data for each node corresponding to the protocol message, an encode processing section 2 which generates a desired protocol message by combining data relating to the nodes of the protocol message managed at the memory managing section 3 along the definition regulated in the definition file 1, and moreover, in accordance with the operational information with respect to the interface library 5 from the exterior section.

Concretely, as shown in FIG. 1, the simulation apparatus for the communication system according to the invention is configured so as to have a basic constituent module 100, an editing time constituent module 101, and an execution time constituent module 102.

(Basic Constituent Module 100)

In FIG. 1, the configuration surrounded due to the frames of the chain line and the chain double-dotted line crossing one another is the basic constituent module 100 of the simulation apparatus for the communication system according to the invention.

In the basic constituent module 100, the definition file 1, the encode processing section 2, the memory managing section 3, the decode processing section 4, and the interface library 5 are included.

In the basic constituent module 100, data in which a protocol convention including a regulated definition of the configuration of the nodes which are the information elements of the protocol message which corresponds to a communication system of the communication terminal 14 serving as an object to be evaluated, for example, the specification 3GPP TS25.331 (RRC Protocol Specification 2002/03) shown in the above-described non-Patent Document 1 or the like is stored in advance in the definition file 1.

Further, the encode processing section 2 generates a desired protocol message, as will be described later, by combining actual data of each node which is an information element in the protocol message managed by the memory managing section 3 along the definition and protocol convention regulated in the definition file 1, and data designated through the interface library 5 as needed.

Further, the decode processing section 4 specifies a data region and a data value allocated to each node which is an information element in the protocol message along the definition and the protocol convention regulated in the definition file 1, and entrusts the management of the node data corresponding to the protocol message to the memory managing section 3, and can output those via the interface library 5.

In this case, the decode processing section 4 is configured so as to classify the protocol message described in the definition file 1 into a tree structure based on the convention described in the definition file 1, and to detect and output a path at which there is an arbitrary node of the protocol message selected by an operator.

Further, the decode processing section 4 is configured so as to detect and output a value of the data of the node with respect to an arbitrary path of the protocol message designated via the interface library 5.

Moreover, concretely, the decode processing section 4 is configured so as to expand a receive protocol message which will be described later into a tree structure (message tree) based on the convention described in the definition file, and to store the message tree in the memory managing section 3.

Further, the memory managing section 3 can manage information including the data relating to the nodes corresponding to a protocol message which is made to be an object to be processed among the protocol messages described in the definition file 1.

Further, the memory managing section 3 is configured so as to be able to output the information including the data relating to the nodes corresponding to the message tree and the protocol messages via the interface library 5 through the decode processing section 4 or the encode processing section 2.

Further, the interface library 5 is concretely formed from an application program interface (API), and may be configured from a plurality of APIs in accordance with the contents to be interfaced.

Then, the interface library 5 interfaces operational information including a selection of the operator with respect to the nodes of the protocol messages described in the definition file 1 based on the API calling information described in an executable format scenario which has been stored in advance in an executable format scenario storage section 9a which will be described later, and interfaces operational information for carrying out the acquisition and setting of a value of data with respect to a specific node in a protocol message by designating a path of a node.

(Editing Time Constituent Module 101)

In FIG. 1, the configuration surrounded with the frame of the chain double-dotted line is the editing time constituent module 101 of the simulation apparatus for the communication system according to the invention.

In the editing time constituent module 101, an encode and decode editing section 6, a second display control section 7, a descriptive format scenario storage section 8, and a display section 13 are included.

In the editing time constituent module 101, a user interface 6a for receiving an operation in each section of node of the desired protocol message in accordance with the operational information including the selection of the operator is incidental to the encode and decode editing section 6.

Then, the encode and decode editing section 6 is configured so as to visualize to display the data of the node of the receive protocol message decoded at the decode processing section 4 via the interface library 5 in accordance with a selecting operation by the operator on the display section 13 via the second display control section 7 by receiving an operation of the operator via a user interface 13a, and so as to display a receive protocol message to which the value of the data of the edited node is reflected via the interface library 5, on the display section 13 via the second display control section 7.

Here, suppose that a pointing device (not illustrated), such as a mouse, a keyboard, or the like, which is used when the operator operates to select a predetermined part on the display screen of the display section 13 by clicking is connected to the user interface 13a.

Further, sequences of the transmission to the communication terminal 14 serving as an object to be evaluated of a protocol message which will be described later and the reception of a response message based on the desired protocol message from the communication terminal 14 serving as an object to be evaluated are stored in descriptive forms (a descriptive format scenario) which can be verified by the operator in the descriptive format scenario storage section 8.

(Execution Time Constituent Module 102)

In FIG. 1, the configuration surrounded with the frame of the chain line is the execution time constituent module 102 of the simulation apparatus for the communication system according to the invention.

The execution time constituent module 102 includes a scenario executing section 9, a trace data managing section 10, a first display control section 11, and a transfer hierarchy section 12 configured from a layer 1 processing section 12a, a layer 2 processing section 12b, and a transmitting buffer 12c a receiving buffer 12d.

In the execution time constituent module 102, the scenario executing section 9 is configured from an executable format scenario storage section 9a in which an executable format file (executable format scenario) for executing sequences of the transmission and the reception of protocol messages is stored, and an execution control section 9b which executes the executable format scenario.

Note that the executable format scenario can be generated by carrying out translation processing such as compile or the like onto the descriptive format scenario described above.

The scenario executing section 9 is configured so as to carry out transmission in a protocol message to the communication terminal 14 serving as an object to be evaluated, and reception in a response message based on the desired protocol message from the communication terminal 14 serving as an object to be evaluated, via the transfer hierarchy section 12 which will be described later.

Further, the trace data managing section 10 manages a sequence of the protocol messages executed by the scenario executing section 9 as trace data.

Further, the first display control section 11 is configured so as to causes to display the trace data managed by the trace data managing section 10 on the display section 13, and to output to edit the protocol messages of the trace data to the encode and decode editing section 6.

In accordance with the configuration, at the time of newly preparing a protocol message, the protocol messages already acquired can be edited and utilized.

The layer 1 processing section 12*a*, the layer 2 processing section 12*b*, and the transmitting buffer 12*c* and the receiving buffer 12*d* are included in the above-described transfer hierarchy section 12.

Here, the layer 1 processing section 12*a* and the layer 2 processing section 12*b* are configured so as to carry out processing for a layer 1 and processing for a layer 2 relating to the protocol messages at the time of transmitting and receiving the protocol messages in communication with the communication terminal 14 serving as an object to be evaluated via the transmitting buffer 12*c* and the receiving buffer 12*d*.

Next, operations of the simulation apparatus for the communication system according to the invention will be described based on FIG. 1.

First, execution time operations carried out by the basic constituent module 100 and the execution time constituent module 102 will be described.

(Execution Time Operations: At the Time of Receiving a Response Signal)

When an analysis of a protocol message is carried out at the time of receiving a response signal from the communication terminal 14 serving as an object to be evaluated, the protocol message which has been received (a receive protocol message) is inputted to the decode processing section 4 via the transfer hierarchy section 12, the scenario executing section 9, and the interface library 5.

The decode processing section 4 prepares a message tree by processing to decode the inputted receive protocol message so as to be expanded in a tree structure, and stores the prepared message tree in the memory managing section 3.

The scenario executing section 9 designates a path denoting a node at which there is the desired data via the interface library 5 in order to obtain desired data from the receive protocol message based on the description of the scenario in the process of being executed onto the decode processing section 4.

The decode processing section 4 extracts data shown by the path designated by the receive protocol message described above, and outputs a value of the data to the scenario executing section 9 via the interface library 5.

In the scenario executing section 9, processings such as a quotation on a value, a determination whether it is good or bad, or the like are carried out onto the value of the designated path in accordance with the contents described in the executable format scenario.

(Execution Time Operations: At the Time of Preparing a Transmission Signal)

When a protocol message to be transmitted to the communication terminal 14 serving as an object to be evaluated (a transmit protocol message) is prepared based on the descriptive format scenario which the scenario executing section 9 executes in the execution section control section 9*b*, the encode processing section 2 changes and prepares the contents of a transmit protocol message based on a transmit protocol message transmitted from the scenario executing section 9 via the interface library 5, or a transmit protocol message selected by a selection instruction with respect to a corresponding protocol message stored in the memory managing section 3, and moreover, a path denoting a node of a value which has been instructed to be changed by the scenario executing section 9, and the value thereof, and stores it in the memory managing section 3, and outputs it to the scenario executing section 9 via the interface library 5.

The scenario executing section 9 transmits the transmit protocol message acquired via the interface library 5 to the communication terminal 14 serving as an object to be evaluated through the transfer hierarchy section 12.

(Editing Time Operations)

The editing time operations will be described centering around the basic constituent module 100 and the editing time constituent module 101.

Editing of a descriptive format scenario can be carried out due to the operator referring to protocol messages displayed on the display section 13.

For example, in order to generate a desired protocol message, the operator can edit a descriptive format scenario by selecting a protocol message which has been stored in advance via the encode and decode editing section 6 and the user interface 6*a*, and changing the value thereof or the like.

First, the operator selects a protocol message which becomes an origin to be modified from the memory managing section 3 via the user interface 6*a*, or selects from trace data which have been managed by the trace data managing section 10 of the execute time constituent module 102, and which have been displayed on the display section 13 via the first display control section 11.

The selected protocol message may be a transmit protocol message or a receive protocol message, and is expanded into a message tree at the decode processing section 4, and is displayed on the display section 13 via the interface library 5, the encode and decode editing section 6, and the second display control section 7.

In this case, when the selected protocol message has been already expanded into a message tree to be stored in the memory managing section 3, the operator may use it.

Next, the operator selects a node which he/she wishes to modify from the displayed message tree via the user interface 6*a*.

The encode and decode editing section 6 designates the node selected for the decode processing section 4 via the interface library 5, and the decode processing section 4 notifies the encode and decode editing section 6 of a path denoting the designated node via the interface library 5.

The encode and decode editing section 6 edits the protocol message to be described in the descriptive format scenario based on the path acquired from the decode processing section 4 and the value varied by the operator in the same way as the selection of the node, and stores it in the descriptive format scenario storage section 8.

Processing such as compile or the like has been applied onto the descriptive format scenario stored in the descriptive format scenario storage section 8, and it can be outputted as an executable format scenario to the scenario executing section 9 of the execution time constituent module 102.

Next, a flow of operations of a simulation method for a communication system will be described based on FIGS. 2A and 2B.

First, when the transfer hierarchy section 12 receives a protocol message from the communication terminal 14 serving as an object to be evaluated (step S1), a protocol message is inputted to the scenario executing section 9 based on the receive protocol message (step S2).

The protocol message inputted to the scenario executing section 9 is provided for referring to the convention described in the definition file 1 (step S3), and for preparing a message tree (step S4), at the decode processing section 4 via the interface library 5.

Then, the message tree prepared at the decode processing section 4 is stored in the memory managing section 3 (step S5), and at the same time, the message tree is stored in the trace data managing section 10 as well via the interface library 5 and the scenario executing section 9 as needed.

Next, processing for a protocol message will be described.

In order to evaluate or refer to a predetermined protocol message, the decode processing section 4 is requested to detect a path by designating a specific node via the interface library 5 from the scenario executing section 9 or the encode and decode editing section 6 (step S6).

The decode processing section 4 detects a path denoting the designated node, and outputs it to an origin of the request (step S7). Here, when the path of the specific node has been already clear for the protocol message, there is no need to execute step S6 and step S7.

Next, the flow of the operations is made to diverge into a case of editing a transmit protocol message, a case of comparatively determining a value of a specific node and a value of a reference node, and a case of comparatively determining a specific protocol message and a reference protocol message in accordance with respective embodiments which will be described hereinafter (step S8).

First, in a case of editing a protocol message, the encode processing section 2 receives a request to generate and edit a protocol message from the scenario executing section 9 or the encode and decode editing section 6, and refers to the definition file 1 for the requested protocol message (step S9), and generates a protocol message which becomes an origin to be edited (step S10).

The scenario executing section 9 or the encode and decode editing section 6 edits the generated protocol message by requesting the encode processing section 2 to edit the protocol message (step S11).

The generated/edited protocol message is outputted to the origin of the generation/editing request. Here, when the scenario executing section 9 has requested to generate/edit the transmit protocol message in accordance with the description of the executable format scenario, the protocol message which has been generated/edited at the encode processing section 2 is transmitted as a transmit protocol message to the communication terminal 14 serving as an object to be evaluated (step S12).

Note that, when the request to generate/edit a protocol message has been carried out from the encode and decode editing section 6, the protocol message which has been generated/edited at the encode processing section 2 can be shown to the operator by being displayed on the display section 13 via the second display control section 7, and can be stored in the descriptive format scenario storage section 8 by being built into the descriptive format scenario.

Next, the case of comparatively determining a value of a specific node of a protocol message and a value of a reference node will be described.

When a specific node of a protocol message which becomes an object to be comparatively determined and a reference node of a protocol message which becomes an origin to be comparatively contrasted are compared, a protocol message serving as an origin to be comparatively contrasted and a path of the specific node detected at step S7 (which becomes a path of a reference node) are designated with respect to the decode processing section 4 from the scenario executing section 9 or the encode and decode editing section 6, and the values thereof are called (step S13).

The calling of the values of the protocol message serving as an origin to be comparatively contrasted and the respective nodes can be realized by designating the contents stored in the memory managing section 3.

Moreover, a protocol message which becomes an object to be comparatively determined and a path of the specific node are designated to the decode processing section 4 from the scenario executing section 9 or the encode and decode editing section 6, and a value of the specific node is read.

The scenario executing section 9 comparatively determines the read value of the specific node and the value of the reference node in accordance with the contents described in the executable format scenario in the process of being executed (step S14).

Note that, when the encode and decode editing section 6 carries out comparative determination, the processing is carried out in accordance with an operation from the operator through the user interface 6a.

The result which has been comparatively determined is displayed as trace data on the display section 3 through the trace data control section 10 and the first display control section 11 from the scenario executing section 9.

In this case, it may be configured such that the comparative determination is carried out based on an instruction, and the result thereof is displayed on the display section 13 through the second display control section 7 (step S15).

Next, the case of comparatively determining a specific protocol message and a reference protocol message will be described.

When a specific protocol message and a reference protocol message are comparatively determined, a protocol message serving as an origin to be comparatively contrasted is designated to the decode processing section 4 from the scenario executing section 9 or the encode and decode editing section 6, and the decode processing section 4 detects the designated protocol message (step S16).

The designation of a protocol message serving as an origin to be comparatively contrasted can be realized by designating the contents stored in the memory managing section 3.

Further, the nodes unnecessary to be comparatively determined can be eliminated from objects to be compared by being designated from the scenario executing section 9 or the encode and decode editing section 6.

Next, a specific protocol message serving as an object to be compared is designated to the decode processing section 4 from the scenario executing section 9 or the encode and decode editing section 6, and the decode processing section 4 carries out comparative determination, and outputs the compared result to the origin of the request (step S17).

Here, when the designation of the comparative determination is carried out from the scenario executing section 9, the comparatively determined result from the decode processing section 4 is displayed as trace data on the display section 13 through the trace data managing section 10 and the first display control section 11 from the scenario executing section 9.

Further, when the designation of the comparative determination is carried out from the encode and decode editing section 6, the comparatively determined result from the decode processing section 4 can be displayed on the display section 13 through the second display control section 11 (step S18).

FIG. 3 is a display example of a screen of the display section 13 using the decode processing section 4 of the invention.

In the display on the screen of FIG. 3, when the operator clicks a node (Value) to be selected via the user interface 6a of the encode and decode editing section 6, a path (identification data) uniformly designating nodes at which there are trees is acquired by the decode processing section 4.

Then, the path (identification data) uniformly designating nodes at which there are trees which is acquired and detected by the decode processing section 4 is displayed on the screen of the display section 13 via the interface library 5 and the encode and decode editing section 6.

In this way, a desired node among the nodes which are the information elements of the protocol messages can be designated by the operator.

EMBODIMENTS

First Embodiment

Next, a first embodiment which is made possible due to a desired node among the nodes which are the information elements of the protocol message being able to be designated by the operator as described above will be described based on FIGS. 4A and 4B.

First, description of a scenario in a case as described above in which processing for embedding a tmsi value into a transmit protocol message of a descriptive format scenario from a receive protocol message will be described.

Figure 4A:
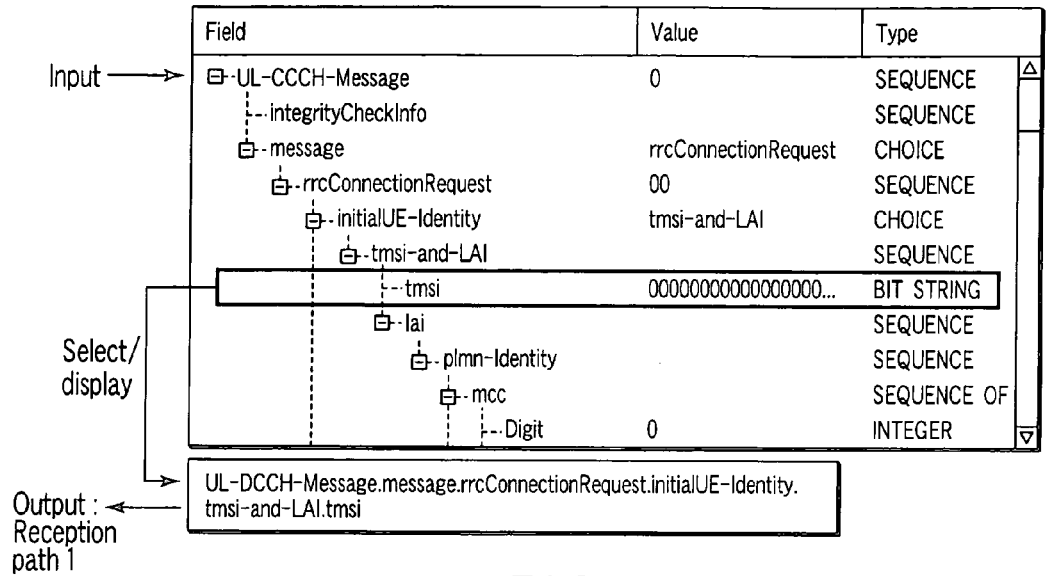
FIG. 4A is a diagram showing a first embodiment made possible due to a desired node which is an information element in a protocol message being able to be designated in the simulation apparatus for the communication system and the simulation method for the communication system according to the invention.

In this case, suppose that, as the receive protocol message, as shown in FIG. 4A, past trace data or a message tree newly prepared at the decode processing section 4 is inputted and is displayed on the screen of the display section 13 in advance.

On such a screen of the display section 13, when the operator selects a value of tmsi in a field to be acquired by clicking via the user interface 6a of the encode and decode editing section 6 from the corresponding message tree, data of a reception path 1 as shown by being surrounded by a frame at the lower portion of FIG. 4A is outputted to the encode and decode editing section 6.

Moreover, the data of the reception path 1 can be added to the descriptive format scenario stored in the descriptive format scenario storage section 8, and is outputted to the executable format scenario storage section 9a by carrying out compile or the like.

Figure 4B:
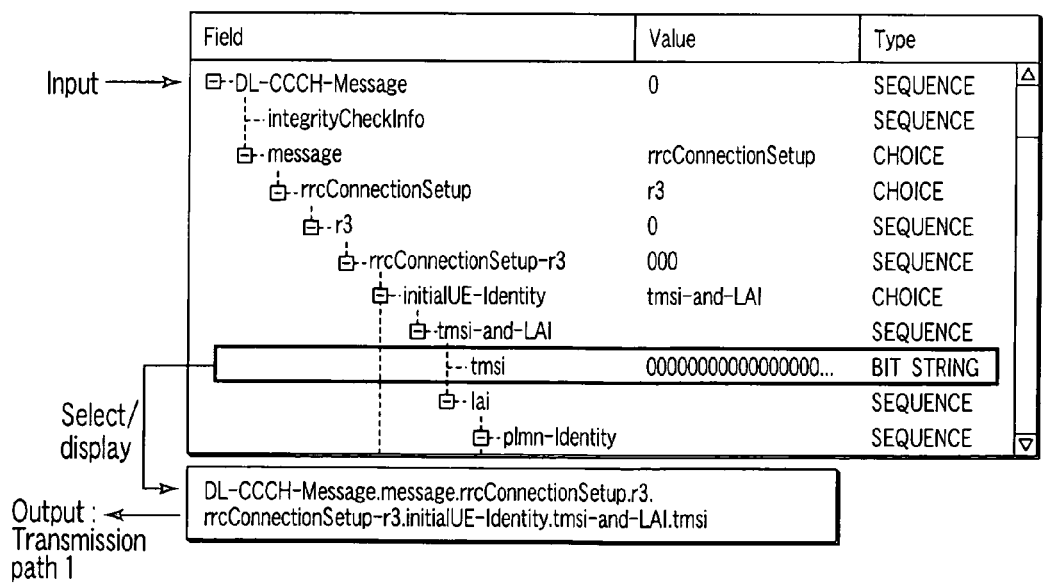
FIG. 4B is a diagram showing the first embodiment made possible due to a desired node which is an information element in a protocol message being able to be designated in the simulation apparatus for the communication system and the simulation method for the communication system according to the invention.

Further, in the case of the transmit protocol message, as shown in FIG. 4B, suppose that past trace data or a message tree prepared at the decode processing section 4 is inputted and is displayed on the screen of the display section 13 in advance.

On such a screen of the display section 13, when the operator selects a value of tmsi in the field at which embedding processing is carried out by clicking via the user interface 6a of the encode and decode editing section 6 from the corresponding message tree, the data of the reception path 1 as shown by being surrounded by a frame at the lower portion of FIG. 4B is outputted to the encode and decode editing section 6.

Moreover, the data of the reception path 1 can be added to the descriptive format scenario stored in the descriptive format scenario storage section 8, and is outputted to the executable format scenario storage section 9a by carrying out compile or the like.

Next, the contents of the description of the descriptive format scenario will be described based on FIG. 5.

In this case, as the contents of the description of the descriptive format scenario, suppose that several scenarios as shown in a table form in FIG. 5 have been described in advance in the executable format scenario storage section 9a as executable format scenarios by carrying out compile or the like.

First, in the first line of the table of FIG. 5, a protocol message at the head of a receiving buffer in which the receive protocol message received from the communication terminal 14 serving as an object to be tested, i.e., an object to be evaluated is stored is housed in RcvDataTmp which is in a predetermined region of the executable format scenario storage section 9a.

Further, in the second line of the table of FIG. 5, an API for decoding is called. Namely, the protocol message (stored in RcvDataTmp) received from the communication terminal 14 serving as an object to be evaluated is decoded at the decode processing section 4 through the interface library 5, and is housed in r_buff which is in a predetermined region of the executable format scenario storage section 9a.

Further, in the third line of the table of FIG. 5, a value of data of the node designated by the reception path 1 of the decoded receive protocol message stored in the above-described r_buff is acquired at the decode processing section 4 through the interface library 5, and is housed in variable 1 which is in a predetermined region of the executable format scenario storage section 9a.

Further, in the fourth line of the table of FIG. 5, a default transmit protocol message is decoded at the decode processing section 4 through the interface library 5, and is housed in s_buff which is in a predetermined region of the executable format scenario storage section 9a.

Here, the default transmit protocol message is prepared from the past trace data at the encode decode processing section 6, or is prepared from the definition file 1 by using the encode decode processing section 6, and is described in a descriptive format scenario in advance.

Further, the default transmit protocol message is stored in the memory managing section 3 in advance, and it may be designated.

Further, in the fifth line of the table of FIG. 5, a value of data of the node denoted by the transmission path 1 in the above-described s_buff is varied to a value of the variable 1 acquired from the receive protocol message described above at the decode processing section 4 through the interface library 5.

Further, in the sixth line of the table of FIG. 5, a final transmit protocol message is generated by encoding the transmit protocol message in the process of being processed which has been housed in the above-described s_buff at the encode processing section 2 through the interface library 5.

Then, in the seventh line of the table of FIG. 5, it is described that the prepared transmit protocol message is transmitted to the communication terminal 14 serving as an object to be tested, i.e., an object to be evaluated.

With respect to the above-described commands for the APIs described in the second to sixth lines of the table in FIG. 5, the processings may be respectively carried out in separate APIs (corresponding to the interface libraries 5), and a plurality of the APIs can be configured so as to be together as one API.

For example, as a combination of the second line and the third line, and a combination of the fourth line to the sixth line, APIs in relation to one another can be defined (configured) as a combination.

Second Embodiment

Next, a second embodiment which is made possible due to a desired node among nodes which are information elements of a protocol message being able to be designated by an operator will be described.

First, a value of a node designation A designated to the receive protocol message received as described above by the operator as described above is acquired by the decode processing section 4.

Next, the decode processing section 4 determines whether a first transmit protocol message a1 or a second transmit protocol message a2 should be transmitted based on the acquired value of the node designation A.

Then, based on the determined result by the decode processing section 4, an appropriate transmit protocol message among the first transmit protocol message a1 and the second transmit protocol message a2 is transmitted to the communication terminal 14 serving as an object to be evaluated from the transfer hierarchy section 12 via the interface library 5 and the scenario executing section 9.

Note that, here, it is described that the selection of the transmit protocol message based on the value of the node designation A is carried out at the decode processing section 4. However, it may be carried out at the scenario executing section 9.

Third Embodiment

Next, a third embodiment which is made possible due to a desired node among nodes which are information elements of a protocol message being able to be designated by an operator will be described.

FIG. 6 is a diagram showing a display example of the third embodiment.

First, with respect to the receive protocol message recorded in the past trace data, a message tree which becomes an object to be determined, nodes, and values of respective data of the nodes are acquired in advance by an instruction of the encode decode processing section 6 at the decode processing section 4.

Then, the decode processing section 4 outputs the message tree, the nodes which become objects to be determined, and the values (Value) of respective data of the nodes which have been acquired to the encode and decode editing section 6 via the interface library 5.

The encode and decode editing section 6 causes to display the message tree, the nodes which become objects to be determined, and the values (Value) of respective data of the nodes which have been acquired in a form as shown in FIG. 6 on the display section 13 via the second display control section 7.

Next, the decode processing section 4 reads expected values (Reference) for being contrasted with the nodes which become objects to be evaluated from the memory managing section 3, the encode decode processing section 6, or the scenario executing section 9 by an instruction from the encode decode processing section 6, and comparatively determines the respective nodes serving as objects to be determined and the respective expected values (Reference).

Then, the decode processing section 4 outputs the comparatively determined results to the encode and decode editing section 6 via the interface library 5.

The encode and decode editing section 6 causes to display the comparatively determined results on the display section 13 via the second display control section 7.

In this case, the respective comparatively determined results are, for example, displayed in blue in a case of being determined PASS, and displayed in red in a case of being determined FAIL.

Accordingly, the operator can determine the presence/absence of an error in the description of a descriptive format scenario or the presence/absence of an error in the operation of the communication terminal 14 serving as an object to be evaluated due to the display of the comparatively determined results.

Here, it is described such that the comparative determination is carried out at the decode processing section 4. However, it may be carried out at the encode and decode editing section 6.

In the case of FIG. 6, the node which becomes an object to be determined is cn-DomainIdentity, and the value of the node is ps-domain. On the other hand, an expected value (Reference) for being contrasted with the node which becomes an object to be determined is cs-domain (correct solution value) as shown by being surrounded with the elliptic frame in the drawing.

Note that, although not illustrated, an expected value (Reference) of only the node which serving as an object to be determined which has been designated by the operator can be displayed.

In this case, the decode processing section 4 acquires a value (Value) designated by the node (path) when a node (path) which serving as an object to be determined is designated with respect to the receive protocol message by the operator.

Next, the decode processing section 4 reads out expected values (Reference) for being contrasted with the nodes which become objects to be evaluated from the memory managing section 3, the encode decode processing section 6, or the scenario executing section 9 by an instruction from the encode decode processing section 6, and determines whether or not a node value (Value) of the each node serving as an object to be determined is a correct solution value (Reference) to be expected.

Then, the decode processing section 4 outputs the comparatively determined results to the encode and decode editing section 6 via the interface library 5.

The encode and decode editing section 6 causes to display the comparatively determined results on the display section 13 via the second display control section 7.

In this case, the comparatively determined results are, for example, displayed in blue in a case of being determined PASS, and displayed in red in a case of being determined FAIL.

Accordingly, in this case as well, the operator can determine the presence/absence of an error in the description of a descriptive format scenario or the presence/absence of an error in the operation of the communication terminal 14 serving as an object to be evaluated due to the display of the comparatively determined results.

Fourth Embodiment

Next, a fourth embodiment which is made possible due to a desired node among nodes which are information elements of a protocol message being able to be designated by an operator will be described.

Figure 7:
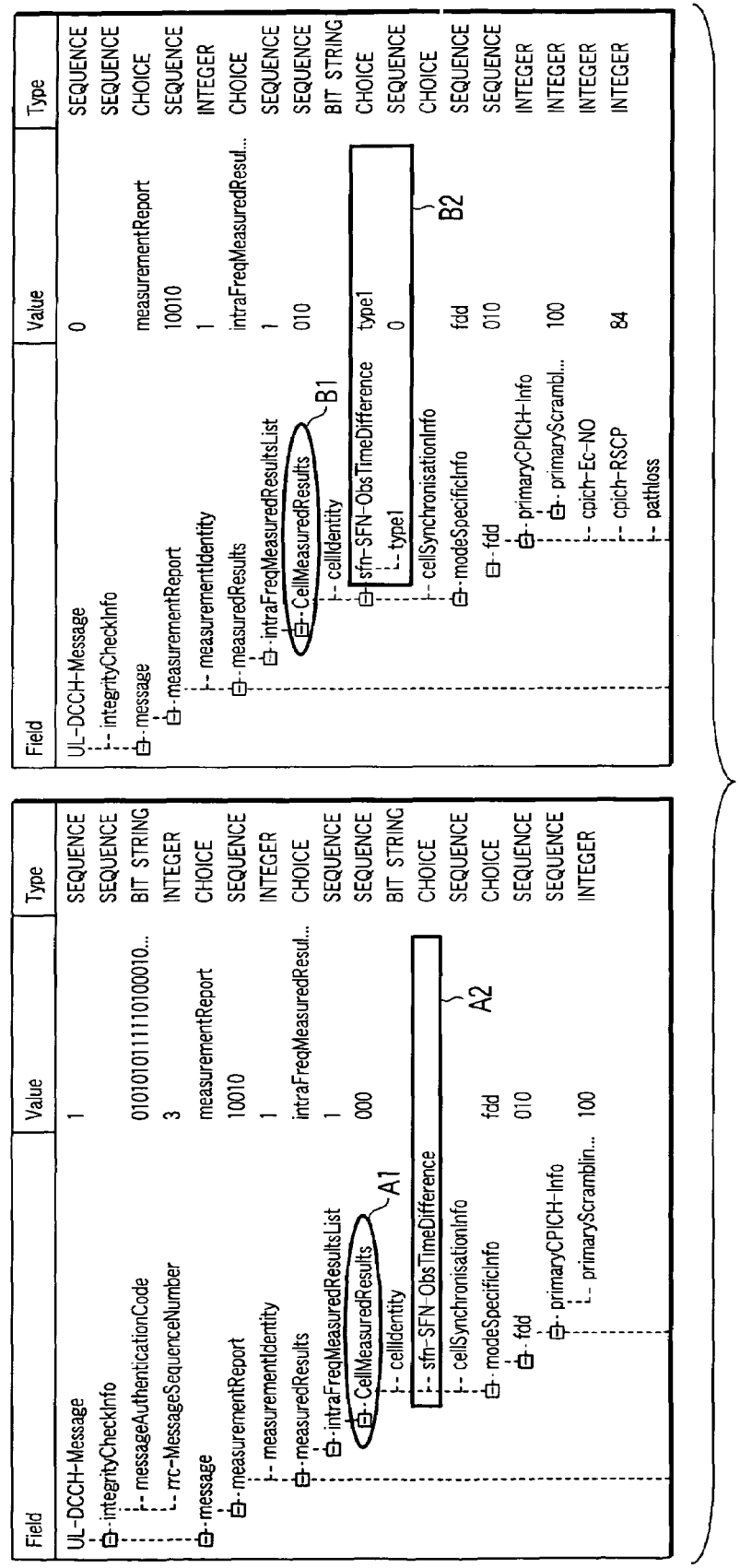
FIG. 7 is a diagram showing a fourth embodiment made possible due to a desired node which is an information element in a protocol message being able to be designated in the simulation apparatus for the communication system and the simulation method for the communication system according to the invention.
Figure 10:
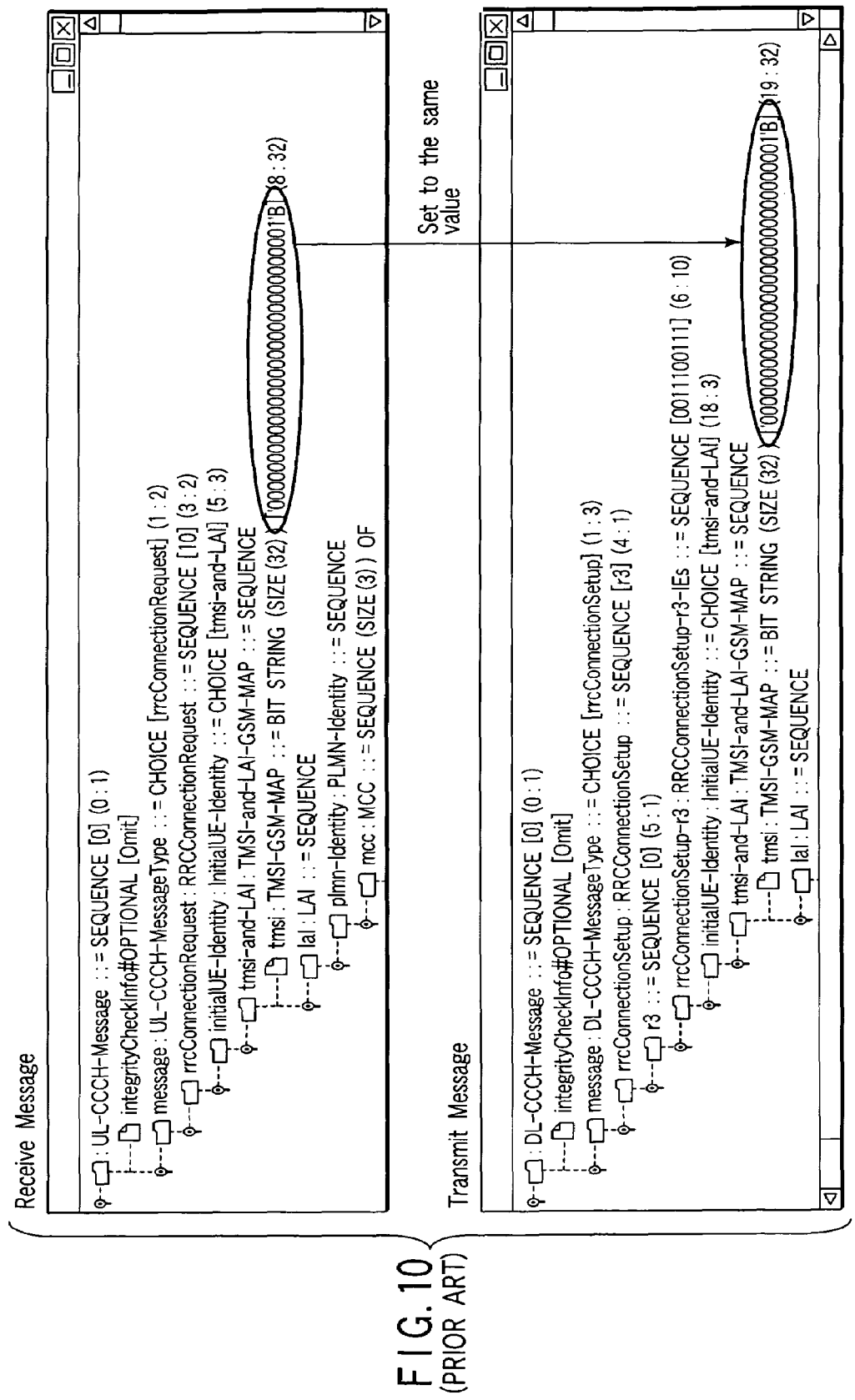
FIG. 10 is a diagram showing an example in which a value of a receive protocol message is embedded into a transmit protocol message for explanation of the problems of the prior art.
Figure 11:
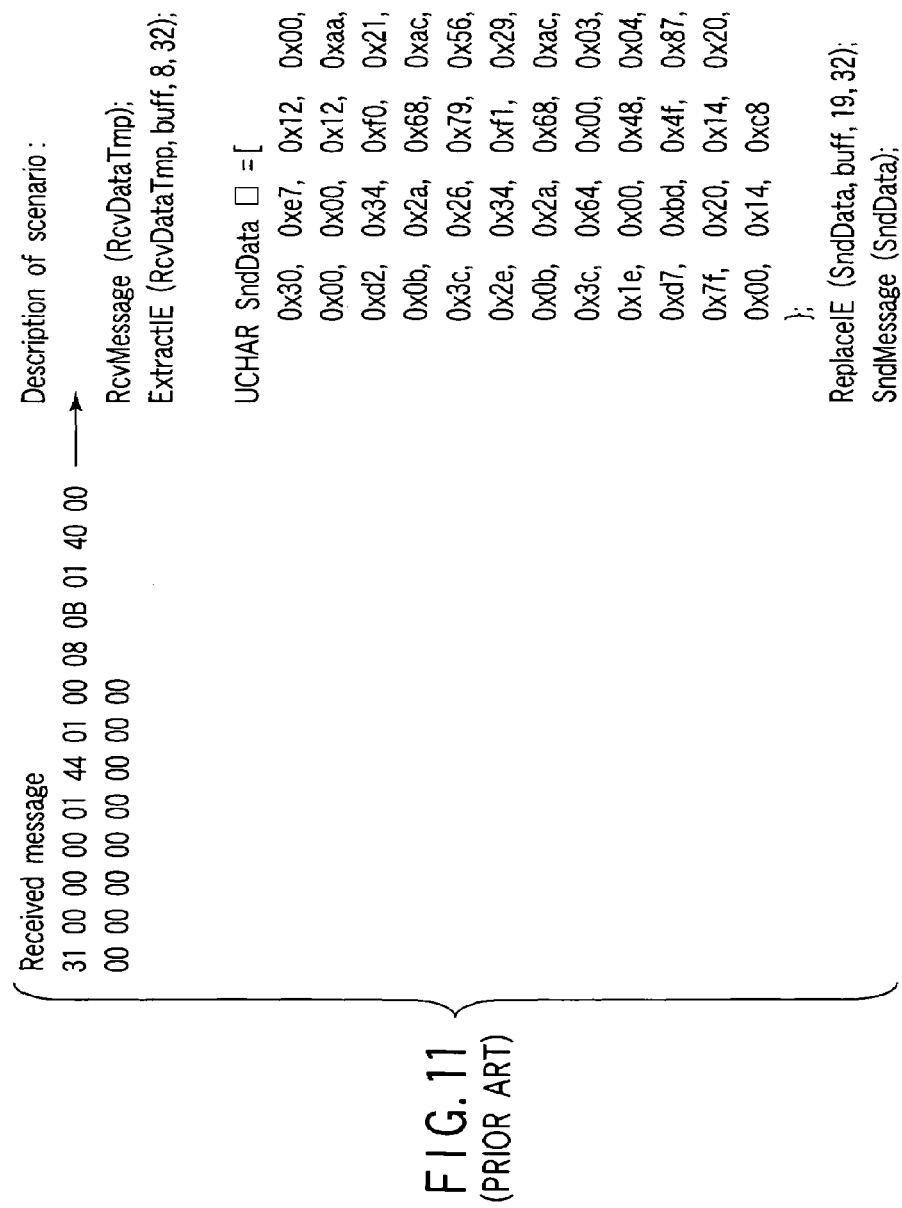
FIG. 11 is a diagram showing an example of the descriptions of FIG. 10 for explanation of the problem of the prior art.

FIG. 7 is a diagram showing a display example of the fourth embodiment.

A protocol message to be evaluated (a receive protocol message or a transmit protocol message) is shown on the left side of FIG. 7, and a protocol message serving as a reference thereof is shown on the right side.

In this case, the protocol message serving as a reference can be made to be one read from the past data (for example, trace data or the like) in a type of the communication terminal 14 serving as an object to be evaluated, or the same type of communication terminal.

For example, in a case of diagnosing a failure due to bad communication or the like in the communication terminal 14 serving as an object to be evaluated, for example, by comparing a receive protocol message of the communication terminal 14 serving as an object to be evaluated and a receive protocol message read from the past data of the same type of communication terminal, the contents of the failure in the communication terminal 14 serving as an object to be evaluated can be determined.

Further, an evaluation at the time of developing a new communication terminal (including a version-up thereof) can be carried out by comparing it with protocol messages of various types of communication terminals.

Here, with respect to the structure of the protocol messages, the tree structure is changed to some extent in accordance with classification into small cases (values of the data of the nodes). However, the information elements corresponding to the selected information elements can be displayed in the message tree on one screen, and the message tree on the other screen can be displayed at the position adjacent thereto on the screen.

Further, when an opening/closing operation of a child tree is carried out in the message tree on one screen, an opening/closing operation of the same child tree can be automatically executed in the message tree on the other screen as well.

In the case of FIG. 7, there are differences in paths at levels less than or equal to "CellMeasuredResults" surrounded with elliptic frames A1 and B1.

In order to display the fact that there are differences, "CellMeasuredResults" is displayed by, for example, a red mark so as to be able to be identified.

Further, in FIG. 7, at the side of the evaluation protocol message surrounded with the square frames A2 and B2, a node which is "sfn-SFN-ObSTimeDifferenCe" is displayed by, for example, a red mark so as to be able to be identified, and at the side of the reference protocol message, a node which is "Sfn-SFN-ObsTimeDifference" and a node which is "type1" at a level less than it are displayed by, for example, a red mark so as to be able to be identified.

In accordance therewith, the operator can determine the difference therebetween even without the nodes corresponding to one another being displayed at the positions adjacent to one another on the screen as described above, and can edit a new scenario based on the determination on the difference.

Accordingly, as described above in detail, in accordance with the invention, a simulation apparatus and a simulation method for a communication system can be provided in which, an operator can easily describe a flexible protocol message test case (simulation), i.e., can easily control a protocol message by using means (a method) for reporting a descriptive format designating a node which is an information element of a protocol message, and an interface library API (Application Program Interface) for accessing to a node at the time of executing the protocol message test case, based on a conception that all the encoding/decoding systems, the structures of protocol messages, and the like are defined in accordance with a specification, and an attempt can be made to describe a protocol message test case even more user-friendly.

The invention claimed is:

1. A simulation apparatus for a mobile communication system, which is incorporated in a mobile communication system simulator serving as a pseudo base station for testing a mobile communication terminal to be evaluated, and which conducts tests for protocol messages in mobile communication with the mobile communication terminal to be evaluated by transmitting test signals to the communication terminal to be evaluated, through a transfer hierarchy section, and receiving response signals from the mobile communication terminal to be evaluated, through the transfer hierarchy section, said simulation apparatus comprising:
   a definition file in which a convention including a definition regulated with respect to a configuration of nodes which are information elements of protocol messages in communication with the mobile communication terminal to be evaluated are described;
   an interface library including an application program interface which provides and receives operational information with respect to the nodes of the protocol messages to and from an exterior section;
   a memory managing section which manages various data relating to the nodes of the protocol messages;
   a decode processing section which specifies a data region and a value of data allocated to each node in the protocol messages by decoding the protocol messages based on the definition regulated in the definition file and in accordance with the operational information from the exterior section to the interface library, and which delivers data of each node corresponding to the protocol messages to the memory managing section;
   an encode processing section which generates a desired protocol message by combining the data relating to the nodes of the protocol messages managed at the memory managing section, based on the definition regulated in the definition file and in accordance with the operational information from the exterior section to the interface library;
   a scenario executing section which includes: (i) an executable format scenario storage section which stores an executable format scenario in which a sequence for executing a transmission in the desired protocol message to the mobile communication terminal to be evaluated and reception in the desired protocol message from the mobile communication terminal to be evaluated, through the transfer hierarchy section is described, and (ii) an execution control section which outputs at least a receive protocol message received from the mobile communication terminal to be evaluated, through the transfer hierarchy section, to the interface library by executing the executable format scenario in accordance with the sequence described in the executable format scenario stored in the executable format scenario storage section;
   a trace data managing section which manages the sequence of the desired protocol message executed at the scenario executing section; and a first display control section which controls a display section to display the sequence of the desired protocol message managed at the trace data managing section, wherein the decode processing section decodes the protocol messages input via the interface library, prepares a message tree showing a relationship of a hierarchy of each node of the protocol messages based on the definition regulated in the definition file, outputs the message tree to the memory managing section, and detects data of an arbitrary node denoted by a path which has been designated from among the data relating to the nodes of the protocol messages managed at the memory managing section based on a path denoting a node at which there is desired data, which is designated via the interface library.

2. A simulation apparatus for a mobile communication system according to claim 1, further comprising:

an encode and decode editing section which has a user interface to receive an editing operation in each section of node of a desired protocol message via the interface library, and which edits the desired protocol message;

a second display control section which controls the display section to display contents of the editing operation in each section of node of the desired protocol message received by the user interface of the encode and decode editing section; and a descriptive format scenario storage section which stores a descriptive format scenario described as a sequence for transmitting and receiving the desired protocol message edited at the encode and decode editing section.

3. A simulation apparatus for a mobile communication system according to claim 2, wherein:

the decode processing section decodes the desired protocol message, prepares a message tree showing a relationship of a hierarchy of each node of the desired protocol message based on the definition regulated in the definition file, causes to display the message tree onto the display section via the second display control section, and outputs it to the memory managing section to thereby detect data of an arbitrary node denoted by a path designated from among the data relating to the nodes of the desired protocol message managed at the memory managing section based on a path denoting a node at which there is desired data, which is designated via the interface library.

4. A simulation apparatus for a mobile communication system according to claim 3, wherein the encode and decode editing section:

acquires a reception path denoting a desired node from the message tree of the desired receive protocol message prepared by the decode processing section in advance, and which relates to reception from the mobile communication terminal to be evaluated, and acquires a value of data of a node of the desired receive protocol message selected based on the reception path, and acquires a transmission path denoting a node corresponding to the selected node of the desired receive protocol message from the message tree of the desired transmit protocol message prepared by the decode processing section in advance, and which relates to transmission to the mobile communication terminal to be evaluated, and inserts a value of data of the selected node of the desired receive protocol message as a value of data of a node of the desired transmit protocol message selected based on the transmission path.

5. A simulation apparatus for a mobile communication system according to claim 1, wherein:

the executable format scenario storage section translates a descriptive format scenario, in which a sequence for executing transmission in a desired protocol message through the transfer hierarchy section to the mobile communication terminal to be evaluated and reception in the desired protocol message from the communication terminal to be evaluated is described, into an executable format scenario, and stores a translated scenario, and the scenario executing section executes the sequence for transmitting and receiving in the desired protocol message with respect to the mobile communication terminal to be evaluated based on the executable format scenario stored in the executable format scenario storage section.

6. A simulation apparatus for a mobile communication system according to claim 1, wherein:

the scenario executing section acquires a reception path denoting a desired node from the message tree of the desired receive protocol message which has been prepared by the decode processing section, and which relates to reception from the communication terminal to be evaluated, acquires a value of data of an arbitrary node denoted by the reception path designated from among the data relating to the nodes of the receive protocol message managed at the memory managing section based on the reception path, reads an expected value stored in the scenario executing section or the memory managing section in advance, and which becomes an origin to be contrasted for determination, and comparatively determines an acquired value of the data of the node and a read expected value.

7. A simulation apparatus for a mobile communication system according to claim 6, wherein:

the first display control section controls the display section to display the value of the data of the node acquired by the scenario executing section and the expected value read by the scenario executing section so as to correspond to each other, and displays a comparatively determined result by the scenario executing section so as to be identified as being normal or abnormal.

8. A simulation apparatus for a mobile communication system according to claim 1, wherein:

the decode processing section selects a desired first node from an evaluation message tree prepared from evaluation protocol messages to be evaluated, and detects a second node which is a path which is the same as a path of the desired first node selected from the evaluation message tree, from a reference message tree prepared from reference protocol messages for being compared with the evaluation protocol messages to be evaluated, and the first display control section controlling the display section to display the first node selected from the evaluation message tree and a reference message tree including the second node detected from the reference message tree so as to be comparable.

9. A simulation apparatus for a mobile communication system according to claim 8, wherein:

in accordance with an opening/closing operation for a child tree from one message tree of the evaluation message tree and the reference message tree, opening/closing of another child tree which is the same as the child tree is carried out.

10. A simulation apparatus for a mobile communication system according to claim 8, wherein:

the evaluation protocol message is a receive protocol message which becomes an object to be evaluated from the mobile communication terminal to be evaluated, and the reference protocol message is a receive protocol message for reference in communication by a terminal of a same type as that of the communication terminal to be evaluated.

11. A simulation method for a mobile communication system, which is incorporated in a mobile communication system simulator serving as a pseudo base station testing a mobile communication terminal to be evaluated, and which conducts tests for protocol messages in communication with the mobile communication terminal to be evaluated by transmitting test signals to the mobile communication terminal to be evaluated, through a transfer hierarchy section, and receiving response signals from the mobile communication terminal to be evaluated, through the transfer hierarchy section, the method comprising:

providing a definition file in which a convention including a definition regulated with respect to a configuration of nodes which are information elements of the protocol messages in communication with the communication terminal to be evaluated has been described;

providing an interface library including an application program interface which provides and receives operational information with respect to the nodes of the protocol messages to and from an exterior section;

providing a memory managing section which manages various data relating to the nodes of the protocol messages;

decoding the protocol messages using a decode processing section and based on the definition regulated in the definition file and in accordance with the operational information from the exterior section to the interface library to thereby specify a data region and a value of data allocated to each node in the protocol messages, and delivering data of each node corresponding to the protocol messages to the memory managing section;

generating a desired protocol message by combining the data relating to the nodes of the protocol messages managed at the memory managing section, using an encode processing section, based on the definition regulated in the definition file and in accordance with the operational information from the exterior section to the interface library;

storing in an executable format scenario storage section, an executable format scenario in which a sequence for executing transmission in the desired protocol message to the mobile communication terminal to be evaluated and reception in the desired protocol message from the mobile communication terminal to be evaluated is described;

enabling at least a receive protocol message received from the mobile communication terminal to be evaluated through the transfer hierarchy section, to be output to the interface library by executing the executable format scenario in accordance with the sequence described in the executable format scenario stored in the executable format scenario storage section;

providing a trace data managing section which manages the sequence of the desired protocol message executed when the executable format scenario is executed by the scenario executing section; and controlling a display section using a first display control section to display the sequence of the desired protocol message managed at the trace data managing section;

wherein the decoding of the protocol messages using the decode processing section comprises:

decoding the protocol messages input via the interface library, providing a message tree showing a relationship of a hierarchy of each node of the protocol messages based on the definition regulated in the definition file, and outputting the message tree to the memory managing section; and detecting data of an arbitrary node denoted by a path designated from among the data relating to the nodes of the protocol messages managed at the memory managing section based on a path denoting a node at which there is desired data, which is designated via the interface library.

12. A simulation method for a mobile communication system according to claim 11, further comprising:

providing an encode and decode editing section and a user interface to receive an editing operation in each section of node of a desired protocol message via the interface library;

editing to encode and decode the desired protocol message using the encode and decode editing section based on the editing operations received at the user interface;

controlling the display section using a second display control section to display contents of the editing operation in each section of node of the desired protocol message received by the user interface in the editing to encode and decode; and storing in a descriptive format scenario storage section a descriptive format scenario in which a sequence for transmitting and receiving the desired protocol message edited in the editing to encode and decode using the encode and decode editing section has been described.

13. A simulation method for a mobile communication system according to claim 12, wherein the decoding of the protocol messages includes:

decoding the desired protocol message, providing a message tree showing a relationship of a hierarchy of each node of the desired protocol message based on the definition regulated in the definition file, and causing to display the message tree onto the display section via the controlling of the display section using the second display control section;

outputting the message tree to the memory managing section; and detecting data of an arbitrary node denoted by a path designated from among the data relating to the nodes of the desired protocol message managed at the memory managing section based on a path denoting a node at which there is desired data, which is designated via the interface library.

14. A simulation method for a mobile communication system according to claim 13, wherein the editing to encode and decode includes:

acquiring the reception path denoting a desired node from the message tree of the desired receive protocol message which has been prepared in advance by the decoding, and which relates to reception from the communication terminal to be evaluated;

acquiring a value of data of a node of the desired receive protocol message selected based on the reception path acquired by the acquiring of the reception path;

acquiring a transmission path denoting a node corresponding to the selected node of the desired receive protocol message from a message tree of a desired transmit protocol message which has been prepared in advance by the decoding, and which relates to transmission to the communication terminal to be evaluated; and inserting a value of data of the selected node of the desired receive protocol message as a value of data of the node of the desired receive protocol message selected based on the transmission path acquired by the acquiring of the transmission path.

15. A simulation method for a mobile communication system according to claim 11, wherein the executing of a scenario includes:

executing the sequence for transmitting and receiving in the desired protocol message with respect to the mobile communication terminal to be evaluated based on the executable format scenario stored in the executable format scenario storage section.

16. A simulation method for a mobile communication system according to claim 11, wherein the executing of a scenario includes:

acquiring the reception path denoting a desired node from the message tree of the desired receive protocol message which has been prepared by the decoding, and which relates to reception from the mobile communication terminal to be evaluated;

acquiring a value of data of an arbitrary node denoted by the reception path designated from among the data relating to the nodes of the receive protocol message managed at the memory managing section denotes based on the reception path acquired by the acquiring of the reception path;

reading an expected value which has been stored in the executable format scenario executing storage section or the memory managing section in advance, and which becomes an origin to be contrasted for determination; and comparatively determining an acquired value of the data of the node and a read expected value.

17. A simulation method for a mobile communication system according to claim 16, wherein the controlling of the display section using the first display control section includes:

causing the display section to display the value of the data of the node acquired when executing the scenario and the expected value read when executing the scenario so as to correspond to each other onto the display section; and causing the display section to display a comparatively determined result from executing the scenario so as to be identified as being normal or abnormal.

18. A simulation method for a mobile communication system according to claim 17, wherein in accordance with an opening/closing operation for a child tree from one message tree of the evaluation message tree and the reference message tree, opening/closing of another child tree which is same as the child tree is carried out.

19. A simulation method for a mobile communication system according to claim 17, wherein the evaluation protocol message is a receive protocol message which becomes an object to be evaluated from the communication terminal to be evaluated, and the reference protocol message is a receive protocol message for reference in communication by a terminal of a same type as that of the communication terminal to be evaluated.

20. A simulation method for a mobile communication system according to claim 11, wherein the decoding includes:

selecting a desired first node from an evaluation message tree prepared from evaluation protocol messages to be evaluated; and detecting a second node which is a path same as the path of the desired first node selected from the evaluation message tree, from a reference message tree prepared from reference protocol messages for being compared with the evaluation protocol messages to be evaluated, and wherein the controlling of the display section using the first display control includes:

causing the display section to display the first node selected from the evaluation message tree and a reference message tree including the second node selected from the reference message tree so as to be compared onto the display section.

* * * * *